(12) United States Patent
Heinen et al.

(10) Patent No.: US 11,001,357 B2
(45) Date of Patent: May 11, 2021

(54) TACTICAL MANEUVERING OCEAN THERMAL ENERGY CONVERSION BUOY FOR OCEAN ACTIVITY SURVEILLANCE

(71) Applicant: Raytheon Company, Waltham, MA (US)

(72) Inventors: Gregory W. Heinen, Tucson, AZ (US); Marcos M. Sastre-Cordova, Warren, RI (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/460,774

(22) Filed: Jul. 2, 2019

(65) Prior Publication Data
US 2021/0001965 A1    Jan. 7, 2021

(51) Int. Cl.
*B63G 8/24*     (2006.01)
*F16K 21/18*   (2006.01)
(Continued)

(52) U.S. Cl.
CPC .............. *B63G 8/24* (2013.01); *F16K 21/18* (2013.01); *F16K 31/18* (2013.01); *B63G 2008/004* (2013.01); *G01S 19/18* (2013.01)

(58) Field of Classification Search
CPC ........ F03B 13/26; F03B 13/16; F03B 13/188; F03B 13/1885; F03B 13/20; F03B 15/00; F03B 13/24; F03B 13/1845; F03B 13/14; F03B 13/142; F05B 2240/93; F05B 2260/4031; F05B 2220/706;
(Continued)

(56) References Cited

U.S. PATENT DOCUMENTS

| | | | |
|---|---|---|---|
| 952,452 | A | 3/1910 | Leon |
| 1,108,192 | A | 8/1914 | Lagergren |

(Continued)

FOREIGN PATENT DOCUMENTS

| | | |
|---|---|---|
| CN | 201550121 U | 8/2010 |
| CN | 205081799 U | 3/2016 |

(Continued)

OTHER PUBLICATIONS

Jones, "Novel Thermal Powered Technology for UUV Persistant Surveillance", Feb. 2006, 11 pages.
(Continued)

*Primary Examiner* — Shafiq Mian

(57) ABSTRACT

A system includes a first jacket that contains seawater and a first tank storing a first fluid under pressure. A second jacket contains seawater and a second tank storing a second fluid under pressure. An actuator cylinder defines a space that receives the fluids from the first and second tanks. The actuator cylinder includes an actuator piston that divides the space into a first volume for the first fluid and a second volume for the second fluid. A hydraulic cylinder includes a hydraulic piston configured to move and change an amount of hydraulic fluid in the hydraulic cylinder, wherein the hydraulic piston is fixedly coupled to the actuator piston. A buoyancy plug changes a position in connection with the amount of the hydraulic fluid in the hydraulic cylinder, wherein the position of the buoyancy plug affects a buoyancy of a vehicle.

20 Claims, 18 Drawing Sheets

(51) Int. Cl.
*F16K 31/18* (2006.01)
*B63G 8/00* (2006.01)
*G01S 19/18* (2010.01)

(58) Field of Classification Search
CPC ......... F05B 2240/97; F05B 2280/5001; Y02E 10/38; Y02E 10/32
See application file for complete search history.

(56) References Cited

U.S. PATENT DOCUMENTS

| | | | |
|---|---|---|---|
| 1,315,267 A | | 9/1919 | White |
| 1,361,561 A | | 12/1920 | Yancey |
| 1,421,369 A | | 7/1922 | Ardo |
| 1,710,670 A | | 4/1929 | Bonney |
| 2,000,746 A | | 5/1935 | Dray |
| 2,381,478 A | | 8/1945 | Zukor |
| 2,537,929 A | | 1/1951 | Daly et al. |
| 2,642,693 A | | 6/1953 | Broady |
| 2,720,367 A | | 10/1955 | Doolittle |
| 2,750,794 A | | 6/1956 | Downs |
| 2,783,955 A | | 3/1957 | Fitz Patrick |
| 2,823,636 A | | 2/1958 | Gongwer et al. |
| 2,826,001 A | | 3/1958 | Presnell |
| 2,845,221 A | | 7/1958 | Vine et al. |
| 2,911,792 A | | 11/1959 | Rinia |
| 2,964,874 A | | 12/1960 | Ruiz |
| 3,157,145 A | | 11/1964 | Farris et al. |
| 3,376,588 A | | 4/1968 | Berteaux et al. |
| 3,633,685 A | * | 1/1972 | Piexoto .................. E21B 17/04 175/6 |
| 3,668,412 A | * | 6/1972 | Vrana .................. F03B 13/262 290/53 |
| 3,698,345 A | | 10/1972 | Kreitner |
| 3,815,555 A | | 6/1974 | Tubeuf |
| 3,818,523 A | | 6/1974 | Stillman, Jr. |
| 3,901,033 A | | 8/1975 | McAlister |
| 3,918,263 A | | 11/1975 | Swingle |
| 4,055,138 A | * | 10/1977 | Klein ................... B63B 21/66 114/244 |
| 4,103,490 A | * | 8/1978 | Gorlov .................. F03B 13/266 417/100 |
| 4,269,030 A | | 5/1981 | Osborne |
| 4,403,154 A | | 9/1983 | Reale et al. |
| 4,445,818 A | | 5/1984 | Ohsaki et al. |
| 4,529,120 A | | 7/1985 | Fleshman, Jr. |
| 4,545,437 A | * | 10/1985 | Denison ................ E21B 17/012 166/345 |
| 4,577,583 A | * | 3/1986 | Green, II .................. B63G 8/00 114/330 |
| 4,850,551 A | * | 7/1989 | Krawetz .................. B64B 1/24 244/97 |
| 4,919,637 A | | 4/1990 | Fleischmann |
| 5,134,955 A | | 8/1992 | Manfield |
| 5,291,847 A | | 3/1994 | Webb |
| 5,303,552 A | | 4/1994 | Webb |
| 5,579,640 A | | 12/1996 | Gray, Jr. et al. |
| 5,615,632 A | | 4/1997 | Nedderman, Jr. |
| 6,142,092 A | * | 11/2000 | Coupland ................ B63B 22/18 114/331 |
| 6,263,819 B1 | | 7/2001 | Gorustein et al. |
| 6,328,622 B1 | | 12/2001 | Geery |
| 6,540,244 B1 | | 4/2003 | Oda |
| 6,601,471 B2 | | 8/2003 | Tarnopolsky et al. |
| 6,651,167 B1 | | 11/2003 | Terao et al. |
| 6,694,844 B2 | | 2/2004 | Love |
| 6,724,574 B2 | | 4/2004 | Wada et al. |
| 6,807,921 B2 | | 10/2004 | Huntsman |
| 7,077,072 B2 | | 7/2006 | Wingett et al. |
| 7,410,395 B2 | | 8/2008 | Kawai et al. |
| 7,501,788 B2 | | 3/2009 | De Abreu |
| 8,046,990 B2 | | 11/2011 | Bollinger et al. |
| 8,069,808 B1 | * | 12/2011 | Imlach .................. B63G 8/22 114/331 |
| 8,106,527 B1 | | 1/2012 | Carr |
| 8,109,223 B2 | | 2/2012 | Jamieson |
| 8,117,842 B2 | | 2/2012 | McBride et al. |
| 8,205,570 B1 | * | 6/2012 | Tureaud .................. B63G 8/14 114/330 |
| 8,448,592 B2 | * | 5/2013 | Crowell .................. B63C 7/26 114/322 |
| 8,794,003 B2 | | 8/2014 | Mauran et al. |
| 9,563,203 B2 | | 2/2017 | Davoodi et al. |
| 9,797,386 B2 | | 10/2017 | Cole et al. |
| 9,834,288 B1 | | 12/2017 | Heinen |
| 10,017,060 B2 | | 7/2018 | Heinen et al. |
| 10,036,510 B2 | | 7/2018 | Heinen et al. |
| 10,364,006 B2 | | 7/2019 | Heinen |
| 2005/0149236 A1 | | 7/2005 | Potter et al. |
| 2005/0217816 A1 | | 10/2005 | Mitschker et al. |
| 2005/0279270 A1 | | 12/2005 | Wingett et al. |
| 2006/0059912 A1 | | 3/2006 | Romanelli et al. |
| 2007/0186553 A1 | | 8/2007 | Lin |
| 2008/0022681 A1 | | 1/2008 | Tafas |
| 2008/0088171 A1 | | 4/2008 | Cheng |
| 2009/0008941 A1 | * | 1/2009 | Irti ...................... F03B 13/1855 290/53 |
| 2009/0178603 A1 | | 7/2009 | Imlach et al. |
| 2009/0277400 A1 | | 11/2009 | Conry |
| 2009/0320477 A1 | | 12/2009 | Juchymenko |
| 2010/0192575 A1 | | 8/2010 | Al-Mayahi et al. |
| 2010/0327605 A1 | | 12/2010 | Andrews |
| 2011/0042956 A1 | * | 2/2011 | Frye ...................... F03B 17/00 290/54 |
| 2011/0051880 A1 | | 3/2011 | Al-Mayahi et al. |
| 2011/0097220 A1 | * | 4/2011 | Tillotson ................ F04B 17/00 417/333 |
| 2011/0101579 A1 | | 5/2011 | Polakowski et al. |
| 2011/0314811 A1 | | 12/2011 | Jones et al. |
| 2012/0091942 A1 | | 4/2012 | Jones et al. |
| 2012/0289103 A1 | | 11/2012 | Hudson et al. |
| 2013/0068973 A1 | | 3/2013 | van Ruth |
| 2013/0180243 A1 | | 7/2013 | Hurtado |
| 2015/0000275 A1 | | 1/2015 | Prueitt |
| 2015/0033717 A1 | | 2/2015 | Hsu |
| 2016/0298498 A1 | | 10/2016 | Kreuger |
| 2017/0349252 A1 | | 12/2017 | Heinen |
| 2018/0118315 A1 | | 5/2018 | Heinen et al. |
| 2018/0118316 A1 | | 5/2018 | Heinen et al. |
| 2018/0119990 A1 | | 5/2018 | Alsadah |
| 2018/0209308 A1 | * | 7/2018 | Heinen .................. F01K 27/005 |

FOREIGN PATENT DOCUMENTS

| | | |
|---|---|---|
| CN | 206421300 U | 8/2017 |
| DE | 215277 C | 12/1906 |
| EP | 2660433 A1 | 11/2013 |
| EP | 2698506 A1 | 2/2014 |
| GB | 235363 A | 6/1925 |
| GB | 541775 A | 12/1941 |
| GB | 658070 A | 10/1951 |
| GB | 2422877 A | 8/2006 |
| GB | 2556968 A | 6/2018 |
| JP | H11113961 A | 4/1999 |
| JP | 2001305226 A | 10/2001 |
| TW | 201018785 A | 5/2010 |
| WO | 9641079 A1 | 12/1996 |
| WO | 2008/140962 A1 | 11/2008 |
| WO | 2011000062 A1 | 1/2011 |

OTHER PUBLICATIONS

Huntsberger et al., "Slocum-TREC Thermal Glider", California Institute of Technology, Jan. 2012, 16 pages.
Huntsberger et al., "Advanced Energy Storage System for Thermal Engines", California Institute of Technology, Jan. 2013, 16 pages.
Chao, "Diurnal Variability Part I: Global 1-km SST (G1SST) Part II:GHRSST-DV-ARGO Obs. System", California Institute of Technology, Feb. 2011, 19 pages.
Nasa,"Utilizing Ocean Thermal Energy in a Submarine Robot", NASA's Jet Propulsion Laboratory, NASA Tech Briefs NPO-43304, Dec. 2008, 4 pages.

(56) References Cited

OTHER PUBLICATIONS

Shimura et al., "Long-Range Time Reversal Communication in Deep Water: Experimental Results", J. Acoust. Soc. Am. 132 (1), Jun. 2012, 5 pages.
Mosca et al., "Low-Frequency Acoustic Source for AUV Long-Range Communication", iXSea, JAMSTEC, Jul. 2013, 9 pages.
Bowen, "A Passive Capture Latch for Odyssey-Class AUVs," Technical Report WHOI-98-12, Jun. 1998, 91 pages.
Singh et al., "Docketing for an Autonomous Ocean Sampling Network," IEEE Journal of Oceanic Engineering, vol. 26, No. 4, Oct. 2001, pp. 498-514.
Bowen et al., "The Nereus Hybrid Underwater Robotic Vehicle for Global Ocean Science Operations to 11,000m Depth," 2008, 10 pages.
Hardy et al., "Unmanned Underwater Vehicle (UUV) deployment and retrieval considerations for submarines," Paper on UUV Development and Retrieval Options for Submarines, Apr. 2008, pp. 1-15.
Bowen, "Flying Plug: A Small UUV Designed for Submarine Data Connectivity (U)," May 1997, 21 pages.
Gish, "Design of an AUV Recharging System," 2004, 134 pages.
Vandenberg, "Manning and Maintainability of a Submarine Unmanned Undersea Vehicle (UUV) Program: A Systems Engineering Case Study," Thesis, Naval Postgraduate School, Sep. 2010, 137 pages.
Griffiths, "Technology and Applications of Autonomous Underwater Vehicles," 2003, 18 pages.
Di Cadilhac et al., "Docking Systems," 2003, 16 pages.
Singh et al., "AOSN MURI: Docking for an Autonomous Ocean Sampling Network," 1998, 6 pages.
International Search Report and Written Opinion of the International Searching Authority dated May 18, 2017 in connection with International Patent Application No. PCT/US2016/062518, 12 pages.
International Search Report and Written Opinion of the International Searching Authority dated May 29, 2017 in connection with International Patent Application No. PCT/US2017/017499, 13 pages.
GYSIN AG, "Planetary Gearbox GPL090," May 2015, 1 page.
GYSIN AG, "Planetary Gearbox GPL120," Jan. 2016, 1 page.
Maxon academy, "Mason Motors as Generators," Feb. 2015, 14 pages.
IndustrialPartsShop, "Specification for W2514-169GK1X-C7T," Feb. 2019, 4 pages.
International Search Report and Written Opinion of the International Searching Authority dated Feb. 12, 2018 in connection with International Patent Application No. PCT/US2017/016976, 18 pages.
"1/14 8x8 Armageddon Hydraulic Dump Truck (Full Metal)", http://www.rc4wdfor"m.com/showthread php?12884-1-14-8x8-Armageddon-Hydraulic-Dump-Truck, Aug. 2016, 23 pages.
Aintablain et al., "A Hydraulic Motor-Alternator System for Ocean-Submersible Vehicles", 10th International Energy Conversion Engineering Conference, Jul. 2012, 13 pages.
Aintablian et al., "A Hydraulic-Alternator System for Ocean Submersible Vehicles", IECEC 2012, Jul. 2012, 12 pages.
Berkner, "How, Why, and When to apply electric motors to mobile hydraulic systems", Parker Hannifin 2008 Global Mobile Sales Meeting & Symposium, Whitepaper #0001, 2008, 10 pages.
Chao, "Autonomous Underwater Vehicles and Sensors Powered by Ocean Thermal Energy", ORE Seminar, Jan. 2016, 1 page.
Chao, "Thermal Recharging Battery for Underwater Instrumentations", Oct. 2013, 1 page.
Daley, "Hydraulic Generator Drive Robust Control", IFPE 2014, Paper 9.1, Mar. 2014, 4 pages.
"HG Hydraulic Generator", Dynaset, Sep. 2016, 5 pages.
"Hydraulic Electrical Generating Systems", Eaton Aerospace Group, Form No. TF500-6B, Jun. 2013, 4 pages.
"Hydraulic Motors", Dayton Lamina Corp., Form 029-3, May 2013, 8 pages.
McGee et al., "Free Piston Hydraulic Pump", Berkeley Robotics & Human Engineering Laboratory, Sep. 2016, 4 pages.
Mosca et al., "Low-Frequency Acoustic Source for AUV Long-Range Communication", iXSea, Jul. 2013, 9 pages.
Swean, Jr., "ONR Unmanned Sea Vehicle Technology Development, AUVSI's Unmanned Systems Program Review 2008", Feb. 2008, 34 pages.
Heinen, "Power Generation Systems Based on Thermal Differences Using Slow-Motion High-Force Energy Conversion", U.S. Appl. No. 16/451,852, filed Jun. 25, 2019, 51 pages.
International Search Report dated Sep. 14, 2020 in connection with counterpart International Patent Application No. PCT/US2020/033848, 3 pages.
Written Opinion of the International Searching Authority dated Sep. 14, 2020 in connection with counterpart International Patent Application No. PCT/US2020/033848, 6 pages.

\* cited by examiner

TACTICAL MANEUVERING OCEAN THERMAL ENERGY CONVERSION BUOY FOR OCEAN ACTIVITY SURVEILLANCE

TECHNICAL FIELD

This disclosure generally relates to underwater vehicles. More specifically, this disclosure relates to a tactical maneuvering ocean thermal energy conversion buoy for ocean activity surveillance.

BACKGROUND

Unmanned underwater vehicles (UUVs) can be used in a number of applications, such as undersea surveying, recovery, or surveillance operations. However, supplying adequate power to UUVs for prolonged operation can be problematic. For example, one prior approach simply tethers a UUV to a central power plant and supplies power to the UUV through the tether. However, this clearly limits the UUV's range and deployment, and it can prevent the UUV from being used in situations requiring independent or autonomous operation. Another prior approach involves using fuel cells in a UUV to generate power, but fuel cells typically require large packages and substantial space.

SUMMARY

This disclosure provides a tactical maneuvering ocean thermal energy conversion buoy for ocean activity surveillance.

In a first embodiment, a system includes a first jacket comprising first and second ports, the first jacket configured to contain seawater and a first tank, the first tank configured to store a first fluid under pressure. The system also includes a second jacket comprising third and fourth ports, the second jacket configured to contain seawater and a second tank, the second tank configured to store a second fluid under pressure. The system also includes an actuator cylinder defining a space configured to receive the first fluid from the first tank and the second fluid from the second tank, the actuator cylinder comprising an actuator piston that divides the space into a first volume for the first fluid and a second volume for the second fluid. The system also includes a hydraulic cylinder defining a space configured to receive a hydraulic fluid, the hydraulic cylinder comprising a hydraulic piston configured to move and change an amount of the hydraulic fluid in the hydraulic cylinder, wherein the hydraulic piston is fixedly coupled to the actuator piston. The system also includes a buoyancy plug configured to change a position in connection with the amount of the hydraulic fluid in the hydraulic cylinder, wherein the position of the buoyancy plug affects a buoyancy of a vehicle.

In a second embodiment, a vehicle includes a body and an energy conversion system. The energy conversion system includes a first jacket comprising first and second ports, the first jacket configured to contain seawater and a first tank, the first tank configured to store a first fluid under pressure. The energy conversion system also includes a second jacket comprising third and fourth ports, the second jacket configured to contain seawater and a second tank, the second tank configured to store a second fluid under pressure. The energy conversion system also includes an actuator cylinder defining a space configured to receive the first fluid from the first tank and the second fluid from the second tank, the actuator cylinder comprising an actuator piston that divides the space into a first volume for the first fluid and a second volume for the second fluid. The energy conversion system also includes a hydraulic cylinder defining a space configured to receive a hydraulic fluid, the hydraulic cylinder comprising a hydraulic piston configured to move and change an amount of the hydraulic fluid in the hydraulic cylinder, wherein the hydraulic piston is fixedly coupled to the actuator piston. The energy conversion system also includes a buoyancy plug configured to change a position in connection with the amount of the hydraulic fluid in the hydraulic cylinder, wherein the position of the buoyancy plug affects a buoyancy of the vehicle.

In a third embodiment, a method includes creating a flow of a first fluid between a first tank and an actuator cylinder and a flow of a second fluid between a second tank and the actuator cylinder, wherein the first tank is disposed in a first jacket that contains seawater and the second tank is disposed in a second jacket that contains seawater, wherein the first and second fluids are stored under pressure, wherein the actuator cylinder defines a space configured to receive the first fluid from the first tank and the second fluid from the second tank. The method also includes moving an actuator piston disposed within the actuator cylinder and a hydraulic piston disposed in a hydraulic cylinder, wherein the hydraulic piston is fixedly coupled to the actuator piston, wherein movement of the hydraulic piston changes an amount of hydraulic fluid in the hydraulic cylinder. The method also includes changing a position of a buoyancy plug in connection with the amount of the hydraulic fluid in the hydraulic cylinder, wherein the position of the buoyancy plug affects a buoyancy of a vehicle.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
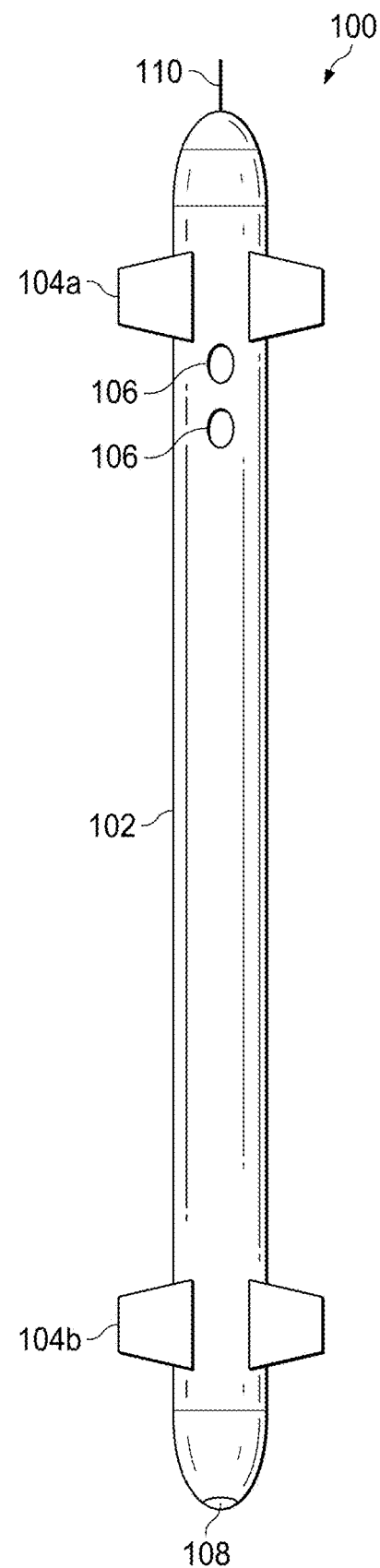
FIG. 1 illustrate an example underwater vehicle configured to operate using ocean thermal energy conversion according to this disclosure.

The figures described below and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity, and is not meant to imply that the feature or component cannot be employed in the embodiments described in connection with that figure.

It will be understood that embodiments of this disclosure may include any one, more than one, or all of the features described here. Also, embodiments of this disclosure may additionally or alternatively include other features not listed here. While the disclosed embodiments may be described with respect to underwater vehicles, these embodiments are also applicable in any other suitable systems or applications.

Vertical diving buoys with fast dives and more periodic dives require more energy than the slower gliders and drifting buoys which take 1-14 days per dive. Such a drifting buoy floats and drifts in ocean currents, navigating for days in the currents at very low speed, remaining at current depths, and not likely to match up with sound channels for surveillance mission operations. Relatively static vertical position at current depth means the buoy does not cross the sound channel very frequently.

In contrast, the embodiments described in this disclosure provide a buoy that performs more periodic dives (e.g., 6-12 dives per hour) with much more frequent diversity sampling of the ocean sound channel, which provides an clear advantage. This advantage is even more substantial when energy is extracted from the ocean, rather than carried within the buoy. Energy extraction from the ocean is based on thermal differences between ocean water at or near the surface (at a temperature of, e.g., 18-25 degrees C.) and ocean water at depths greater than 500-1000 m (at a temperature of, e.g., 5-8 degrees C.). The problem of endurance is solved by using a conversion technique that is more efficient than extracting the energy and storing it in batteries for future dive buoyancy engine needs.

The duality of energy extraction with fast, low thermal loss dives and the much more frequent crossing of the sound channel solves problems of energy use, and allows for autonomous operation and higher mobility, as the buoy uses the vertical speed component to spend less time in diverse currents. The disclosed buoy requires no electrical power storage to operate the buoyancy engine. The disclosed buoyancy engine does not exhibit any of the loss mechanisms that are present in power systems, such as friction at the seals of a hydraulic pump, duct losses from small hydraulic lines, valve losses, and other factors related to electrical power conversion losses.

FIG. 1 illustrate an example underwater vehicle 100 configured to operate using ocean thermal energy conversion according to this disclosure. In this example, the vehicle 100 denotes an unmanned underwater vehicle or other device that can function as both a buoy and a glider within an ocean or other body of water. As discussed in greater detail below, the vehicle 100 uses ocean thermal energy conversion with a hydraulic and carbon dioxide ($CO_2$) hybrid configuration that can be packaged into a long vertical buoy. The vehicle 100 could be used to support various functions, such as undersea surveying, recovery, or surveillance operations.

The vehicle 100 is configured to dive to ocean depths greater than 1000 meters once every 1-3 hours and return to the surface or a shallow depth, transporting through ocean sound channels, which can be monitored as the vehicle 100 passes through 8 to 24 times a day, thereby making the vehicle 100 an advantageous acoustic surveillance vessel.

As shown in FIG. 1, the vehicle 100 includes a body 102 having fins 104a-104b disposed near ends of the body 102. The body 102 is elongate and is oriented for vertical or substantially vertical travel within an ocean or other body of water. In some embodiments, the body 102 has an overall length of approximately 10-15 feet and a diameter of approximately 12 inches. Of course, this is merely one example, and the body 102 could have larger or smaller dimensions.

The body 102 denotes any suitable structure configured to encase, protect, or otherwise contain other components of the vehicle 100. The body 102 could be formed from any suitable material(s) and in any suitable manner. The body 102 can be formed so that the vehicle 100 is able to withstand extremely elevated pressures found at deep depths in an ocean or other body of water. In some embodiments, the body 102 could allow the vehicle 100 to operate at depths of up to 1,000 meters or more.

The fins 104a-104b denote projections from the body 102 that help to stabilize the body 102 during travel. Each of the fins 104a-104b could be formed from any suitable material(s) and in any suitable manner. Also, each of the fins 104a-104b could have any suitable size, shape, and dimensions. Further, at least some of the fins 104a-104b could be movable or adjustable to help alter the course of the body 102 and to steer the body 102 through water during travel. In addition, the numbers and positions of the fins 104a-104b shown here are examples only, and any numbers and positions of fins could be used to support desired operations of the vehicle 100. For example, in embodiments where the vehicle 100 operates primarily at the surface of the water, the vehicle 100 may include only the bottom fins 104b (the top fins 104a may be omitted).

As described below, the underwater vehicle 100 can both ascend and descend within a body of water during use. In some embodiments, the fins 104a could be used to steer the vehicle 100 while ascending, and the fins 104b could be used to steer the vehicle 100 while descending. Moreover, when the vehicle 100 is ascending, the fins 104a can be used to control the pitch of the vehicle 100, and a differential between the fins 104a can be used to control the roll of the vehicle 100. Similarly, when the vehicle 100 is descending, the fins 104b can be used to control the pitch of the vehicle 100, and a differential between the fins 104b can be used to control the roll of the vehicle 100. Orientation or shape of the fins 104a-104b can be selected to steer the vehicle 100 in a direction that includes a horizontal component as well as a vertical component. That is, the vehicle 100 can travel laterally over time, as well as up and down.

Multiple ports 106 are disposed on exterior surfaces of the vehicle 100. As described in greater detail with respect to FIG. 2 below, the ports 106 allow seawater to enter into, or be discharged from, one or more compartments or cavities (referred to herein as jackets) internal to the vehicle 100. The ports 106 are generally Low energy, low power (e.g., 12V 1A) ports that are capable of opening or closing in approximately 5 seconds. In some embodiments, the ports 106 are located on opposite sides of the vehicle 100 along a length of the vehicle 100. Each port 106 includes any suitable structure configured to allow seawater to enter or exit internal portions of the vehicle 100. Each of the ports 106 could be formed from any suitable material(s) and in any suitable manner. Also, each of the ports 106 could have any suitable size, shape, and dimensions. Note that the number and positions of the ports 106 shown here are examples only, and any number and positions of ports could be used in the vehicle 100.

A buoyancy plug 108 is disposed at the bottom end of the vehicle 100. The buoyancy plug 108 is a rigid or flexible structure that alternatively extends or expands from surrounding portions of the vehicle 100 or contracts to be substantially flush with surrounding portions of the vehicle 100. The position of the buoyancy plug 108 affects the overall volume and buoyancy of the vehicle, which, in turn, controls the dive operation of the vehicle 100. In its extended position, the buoyancy plug 108 causes the vehicle 100 to have an overall larger volume or water displacement, thus causing the vehicle 100 to be more buoyant and to rise or float in seawater. In its contracted position, the buoyancy plug 108 causes the vehicle 100 to have an overall smaller volume or water displacement, thus causing the vehicle 100 to sink in seawater. The buoyancy plug 108 includes any suitable structure configured to vary in shape or position to affect the overall volume of the vehicle 100. In some embodiments, the buoyancy plug 108 is a rigid cylindrical plug that slides outward and inward with respect to the body 102 of the vehicle 100. In other embodiments, the buoyancy plug 108 is a flexible bladder or diaphragm that expands outward and contracts inward with respect to the body 102 of the vehicle 100.

In some embodiments, the vehicle 100 can include an optional solar mast 110 at (or extending from) the top surface of the vehicle 100. The solar mast 110 can include one or more solar panels for additional energy generation. This could provide auxiliary power for operation of one or more components of the vehicle 100, such as one or more of the ports 106, a communication system, or one or more motors to control orientation of one or more fins 104a-104b.

Figure 2:
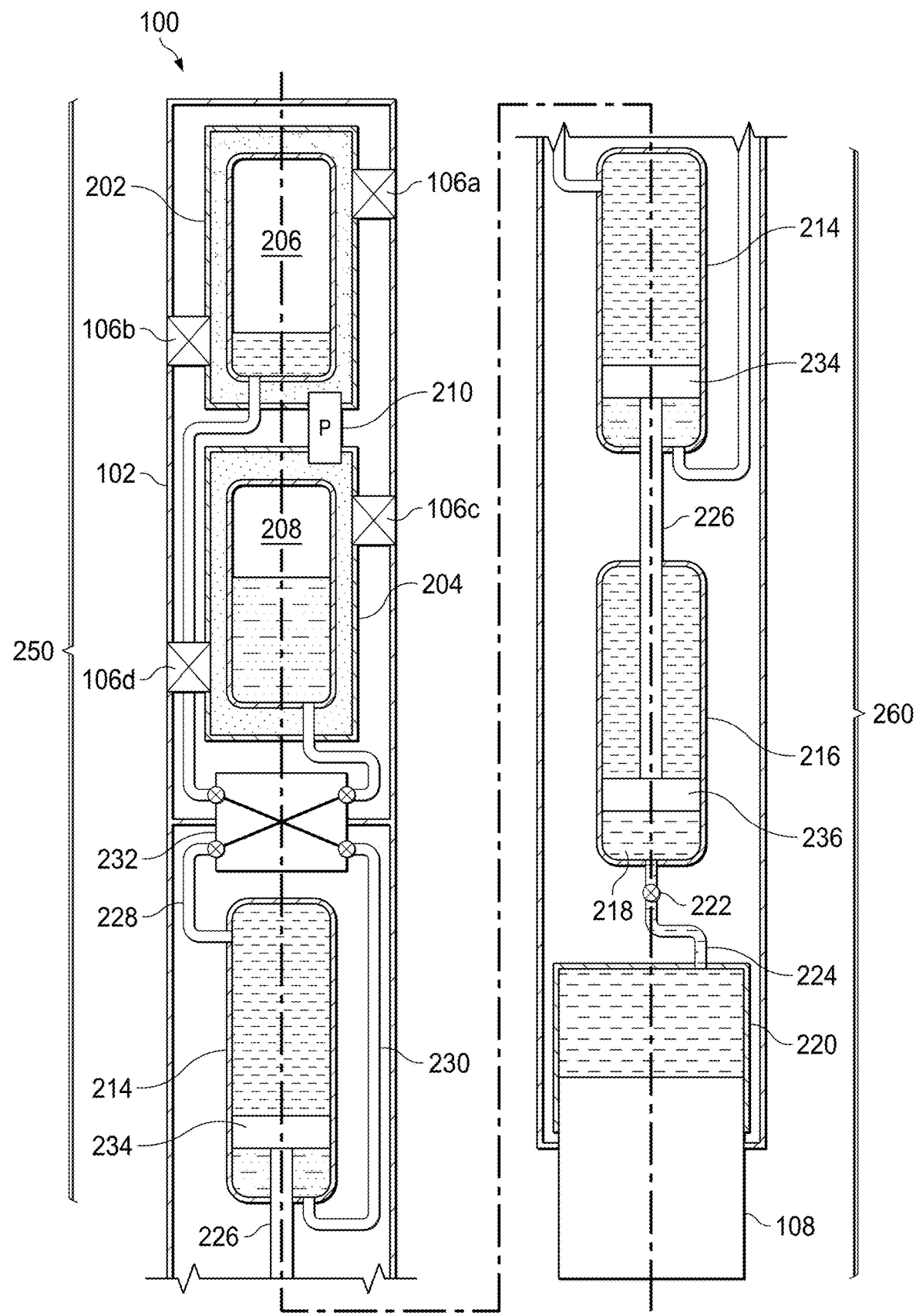
FIG. 2 shows additional details of the vehicle of FIG. 1 according to this disclosure.

FIG. 2 shows additional details of the vehicle 100 of FIG. 1 according to this disclosure. In particular, FIG. 2 is a cross-section view of the vehicle 100, and illustrates components that are disposed internally in the vehicle 100. The view of the vehicle 100 in FIG. 2 is split vertically into a top portion 250 and a bottom portion 260 in order to more clearly show each component on the page. The bottom portion 260 of the view extends the view below the top portion 250. To illustrate continuity of parts, some components of the vehicle 100 are shown in both portions 250, 260.

As shown in FIG. 2, the vehicle 100 includes an energy conversion system (or buoyancy engine) that includes ports 106a-106d (which represent different ones of the ports 106 in FIG. 1), the buoyancy plug 108, a top jacket 202, a bottom jacket 204, a top tank 206, a bottom tank 208, a pump 210, an actuator cylinder 214, a hydraulic cylinder 216, hydraulic fluid 218, a fluid reservoir 220, a hydraulic valve 222, a hydraulic line 224, a connecting rod 226, a first fluid line 228, a second fluid line 230, crossover valves 232, an actuator piston 234, and a hydraulic piston 236.

The top jacket 202 and bottom jacket 204 are chambers disposed at or near the top of the vehicle 100 and are configured to hold seawater that enters or exits through the ports 106a-106d. Each jacket 202-204 can contain warm, cool, or cold seawater, depending on where the vehicle 100 is in a dive cycle. Over the course of one dive cycle (both descent and ascent), each jacket 202-204 will exchange warm water for cold water or vice versa. The pump 210, which is a low power pump, can operate in either direction to move water from the top jacket 202 to the bottom jacket 204 or vice versa. Each jacket 202-204 includes any suitable structure configured to hold seawater at different temperatures. Each jacket 202-204 can include insulated walls to minimize unwanted transfer of thermal energy into or out of each jacket 202-204.

The top jacket 202 contains the top tank 206, and the bottom jacket 204 contains the bottom tank 208. Each tank 206-208 is configured to hold liquid and gas $CO_2$ at high pressures (e.g., greater than 1000 psi). The $CO_2$ in each tank 206-208 is alternatively warmed and cooled (via conductive heat transfer through the walls of the tank 206-208) by the water held in the corresponding jacket 202-204. Over the course of one dive cycle, each tank 206-208 is exposed to water at varying temperatures. The warming and cooling of the $CO_2$ in each tank 206-208 cause pressure differences that result in movement of the actuator cylinder 214 and the hydraulic cylinder 216, as described in greater detail below.

The actuator cylinder 214 generally defines a space in which liquid $CO_2$ from the tanks 206-208 can enter and exit. The actuator cylinder 214 includes an actuator piston 234, which separates the internal space in the actuator cylinder 214 into two volumes filled with the $CO_2$ from the tanks 206-208. The actuator cylinder 214 is fluidly coupled to the top tank 206 via the first fluid line 228, and is fluidly coupled to the bottom tank 208 via the second fluid line 230. Each fluid line 228-230 includes any suitable passageway configured to allow transport of $CO_2$ between a tank and a cylinder. The crossover valves 232 can be used to open and close the flow of $CO_2$ within the fluid lines 228-230.

Liquid $CO_2$ can flow into and out of the top tank 206 and into and out of a first portion of the actuator cylinder 214. Similarly, liquid $CO_2$ can flow into and out of the bottom tank 208 and into and out of a second portion of the actuator cylinder 214. Differences in $CO_2$ pressure between the tanks 206-208 (which may be caused by thermal differences) can determine whether the $CO_2$ flows into the top tank 206 or the first portion of the actuator cylinder 214 and whether the $CO_2$ flows into the bottom tank 208 or the second portion of the actuator cylinder 214. The actuator cylinder 214 includes any suitable structure defining a space configured to receive $CO_2$ from multiple tanks. Note that the actuator cylinder 214 may have any suitable shape and may or may not have a circular cross-section.

The hydraulic cylinder 216 generally defines a space in which the hydraulic fluid 218 can enter from the fluid reservoir 220 or exit to the fluid reservoir 220 through the hydraulic line 224. The hydraulic valve 222 can open or close to allow or restrict the flow of the hydraulic fluid 218 between the hydraulic cylinder 216 and the fluid reservoir 220. The hydraulic cylinder 216 includes a hydraulic piston 236 that defines the internal space occupied by the hydraulic fluid 218. The hydraulic piston 236 is fixedly coupled to the actuator piston 234 by the connecting rod 226, such that the pistons 234-236 and the connecting rod 226 move together.

The fluid reservoir 220 generally defines a space in which the hydraulic fluid 218 can be stored. The internal volume of the fluid reservoir 220 is determined by the position of the buoyancy plug 108, which is configured to move laterally in and out the fluid reservoir 220. Pressure differences between the hydraulic fluid 218 and the external sea water can cause the buoyancy plug 108 to move in or out, thereby changing the volume of the fluid reservoir 220. Since the total amount of hydraulic fluid 218 within the hydraulic cylinder 216, the hydraulic line 224 and the fluid reservoir 220 is constant, movements of the pistons 234-236 and the buoyancy plug 108 are fluidly coupled and are essentially simultaneous.

In one aspect of operation, during different portions of a dive cycle, the vehicle 100 alternately vents or receives warmer or colder water through the ports 106a-106d.

Changes in temperature in the water result in changes in temperature in the $CO_2$ in each tank 206-208. The $CO_2$ temperature changes create a pressure difference in the hydraulic cylinder 216, which moves the connected pistons 234-236, pushing hydraulic fluid 218 into the fluid reservoir 220 or removing hydraulic fluid 218 from the fluid reservoir 220. This affects the position of the buoyancy plug 108, thereby creating positive or negative buoyancy. Further details regarding the operation of the vehicle 100 during a dive will now be provided with respect to FIGS. 3A through 3L and FIG. 4.

FIGS. 3A through 3L illustrate operations and configurations of the vehicle 100 during one dive cycle according to this disclosure. Corresponding positions of the vehicle 100 during the dive cycle are shown in FIG. 4.

Figure 3A:
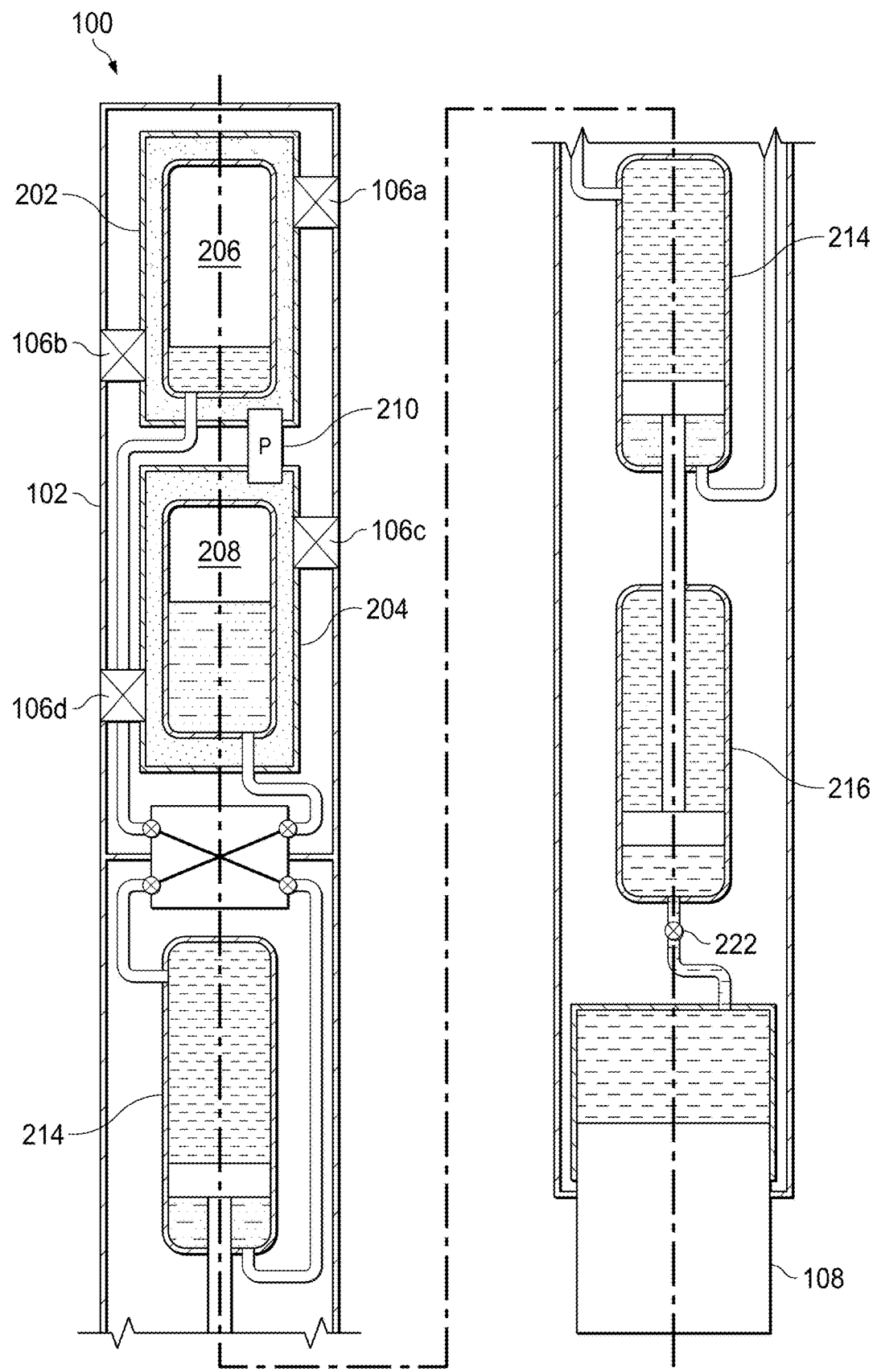
FIGS. 3A through 3L illustrate operations and configurations of the vehicle of FIG. 1 during one dive cycle according to this disclosure.
Figure 4:
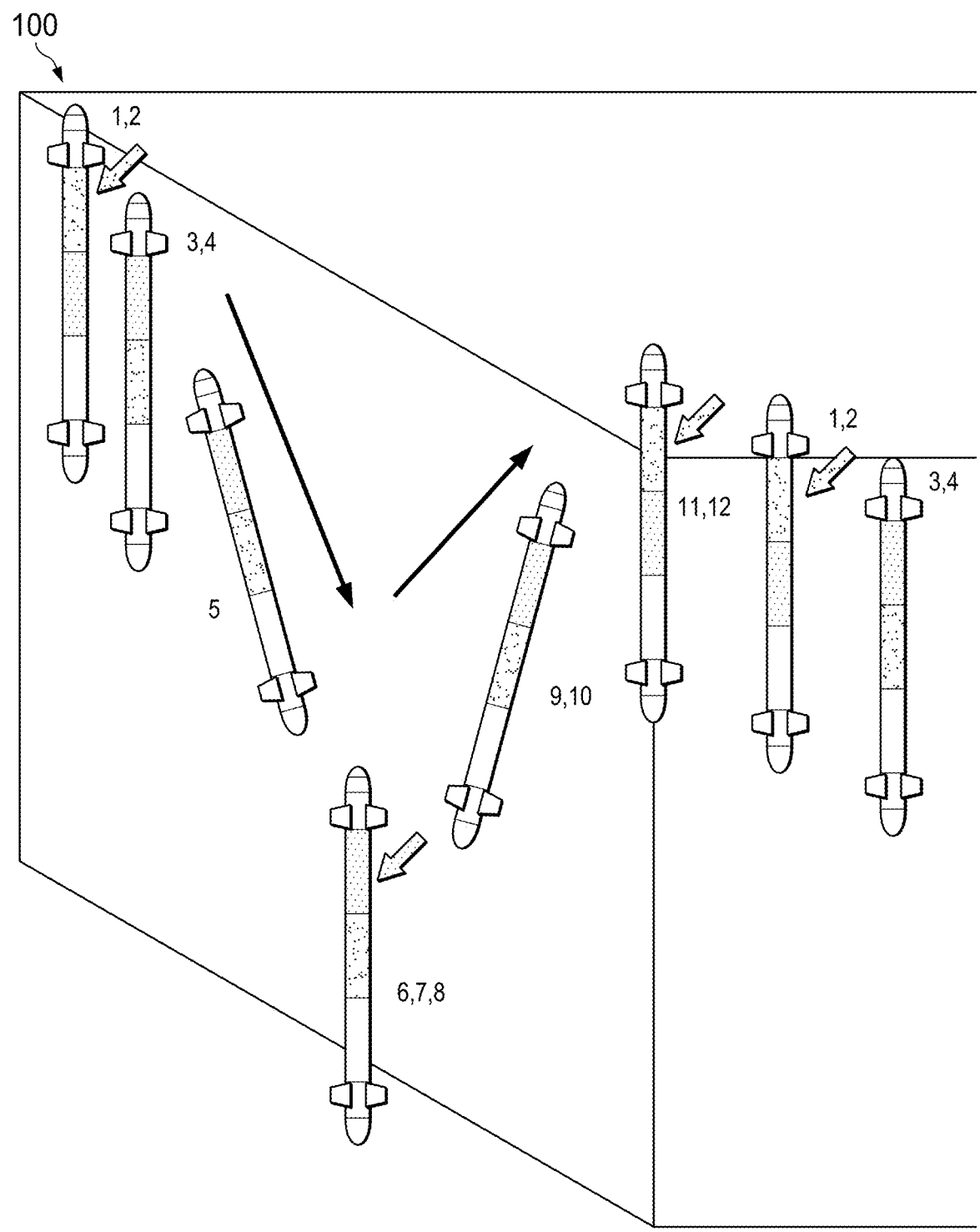
FIG. 4 illustrates corresponding positions of the vehicle of FIG. 1 during the dive cycle described in FIGS. 3A through 3L.

As shown in FIG. 3A, and with respect to position #1 in FIG. 4, the vehicle 100 is at the surface of the water prior to a dive. At this point, the vehicle 100 has recently been deployed on the water surface or has ascended from a previous dive. The buoyancy plug 108 is extended outward from the body 102 of the vehicle 100, which maximizes the overall volume of the vehicle 100, thereby resulting in greatest buoyancy. The hydraulic valve 222 is closed, thus maintaining the buoyancy plug 108 in its extended position.

Warm $CO_2$ in the actuator cylinder 214 from the previous dive has started to cool off. The fluid temperatures in the top jacket 202 and the top tank 206 are warmer than the fluid temperatures in the bottom jacket 204 and the bottom tank 208. The relatively colder water in the bottom jacket 204 was carried from the bottom of the previous dive and remains relatively cold. The relatively colder $CO_2$ in the bottom tank 208 is at a relatively low $CO_2$ pressure. The ports 106a-106d are closed.

Figure 3B:
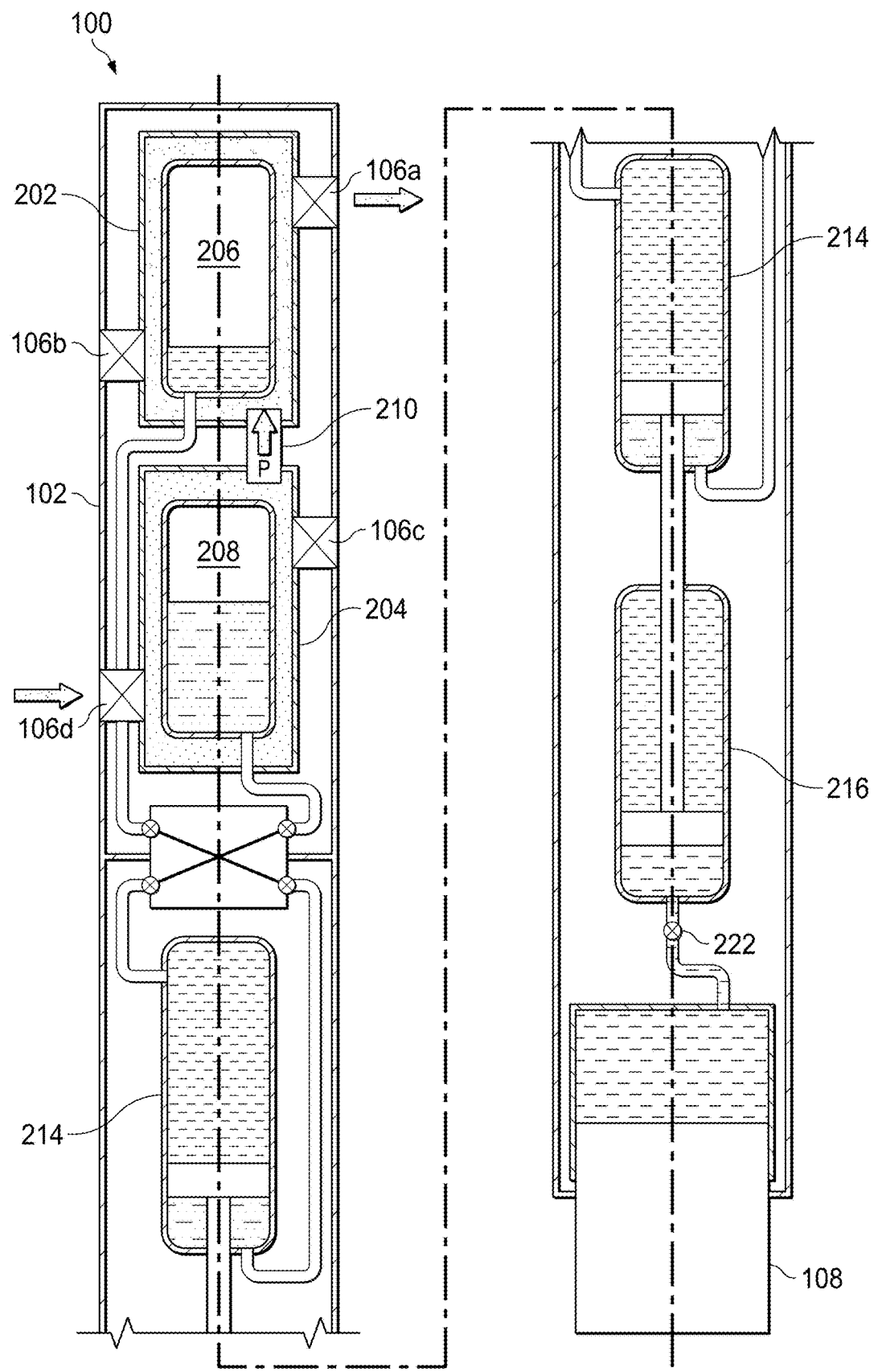

As shown in FIG. 3B, and with respect to position #2 in FIG. 4, the vehicle 100 is still at the water surface. The port 106a of the top jacket 202 opens, and the port 106d of the bottom jacket 204 opens. The pump 210 operates to transfer colder water from the bottom jacket 204 to the top jacket 202. The transfer of water from the bottom jacket 204 to the top jacket 202 causes warm seawater at the surface (e.g., 18-25 degrees C.) to enter the bottom jacket 204 through the port 106d, and causes warm water to vent out of the top jacket 202 through the port 106a. The operation of the pump 210 is a timed operation. At the end of the pump operation, the top jacket 202 has most of the cold seawater that was previously contained in the bottom jacket 204. When the pump 210 times out, the port 106c on the bottom jacket 204 opens to induce thermal gravity flow, as described with respect to FIG. 3C.

Figure 3C:
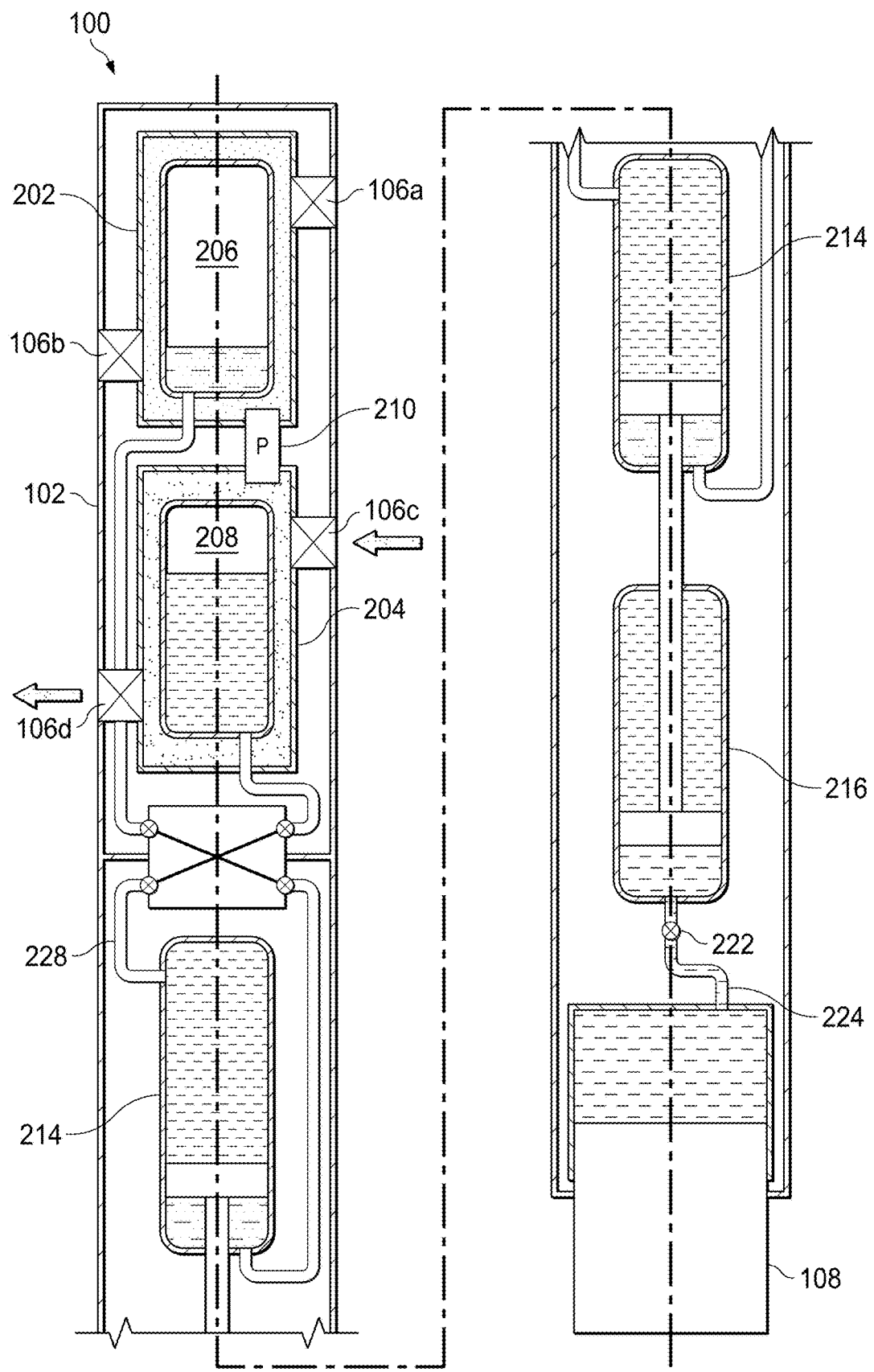

As shown in FIG. 3C, and with respect to position #3 in FIG. 4, the vehicle 100 begins to descend from the water surface. Both ports 106c-106d of the bottom jacket 204 are now open, and the pump 210 is off. This configuration allows a gravity density feed to operate by induction. The top tank 206 cools and the bottom tank 208 warms up as fresh surface water flows in through the port 106c. The objective here is that a temperature difference of approximately 3 degrees C. between the $CO_2$ in the respective tanks 206-208 will produce a pressure difference of approximately 100 psi, which is easily capable of moving the buoyancy plug 108 against friction and line losses in the hydraulic line 224.

Figure 3D:
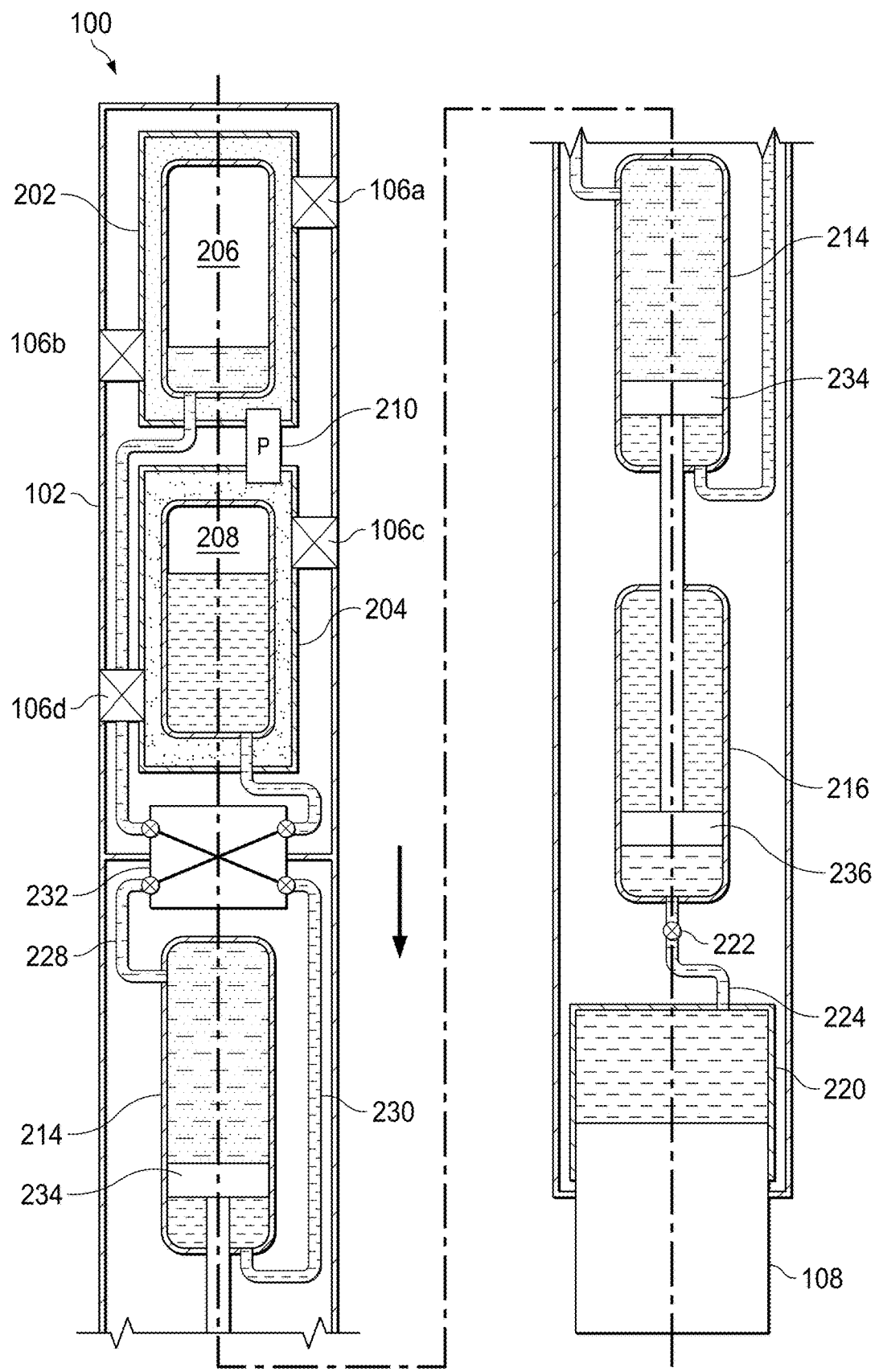

As shown in FIG. 3D, and with respect to position #4 in FIG. 4, the vehicle 100 is beginning its dive. The hydraulic valve 222 opens, allowing hydraulic fluid 218 to flow through the hydraulic line 224, thereby permitting the pistons 234-236 freedom to move. A timed operation of the crossover valves 232 causes $CO_2$ to flow through the fluid lines 228-230. In particular, $CO_2$ flows through the first fluid line 228 from the actuator cylinder 214 to the top tank 206, and $CO_2$ flows through the second fluid line 230 from the bottom tank 208 to the actuator cylinder 214. This changes the fluid levels in the actuator cylinder 214, which in turn causes the pistons 234-236 to move inward. When the piston 236 moves inward, hydraulic fluid 218 is drawn from the fluid reservoir 220 into the hydraulic cylinder 216, thereby retracting the buoyancy plug 108 for initial descent.

At an intermediate point in time (e.g., after a short period under 1 minute), the second fluid line 230 closes and the first fluid line 228 remains open. The buoyancy plug 108 pushes cold $CO_2$ from the actuator cylinder 214 back into the top tank 206. The descent of the vehicle 100 and the rising water pressure further causes the buoyancy plug 108 to retract.

Figure 3E:
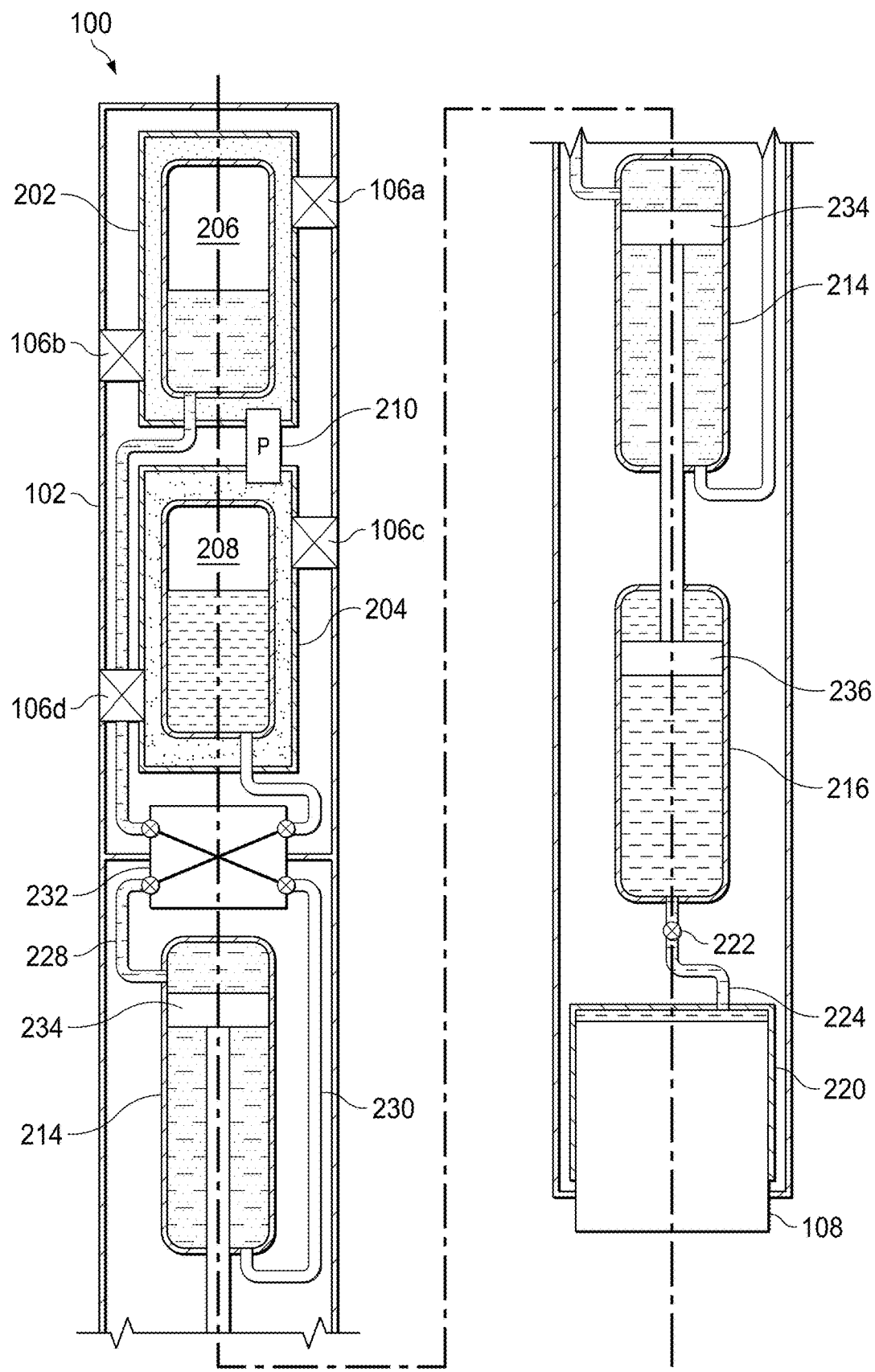

As shown in FIG. 3E, and with respect to position #5 in FIG. 4, the vehicle 100 is descending. Increasing water pressure at increasing depths overcome the internal pressure on the buoyancy plug 108, causing the buoyancy plug 108 to be completely depressed into the fluid reservoir 220. The vehicle 100 increases its speed of descent, eventually reaching a terminal velocity. The depth of the vehicle 100 can be measured by seawater pressure, and the descent can be profiled using on-board sensors.

Figure 3F:
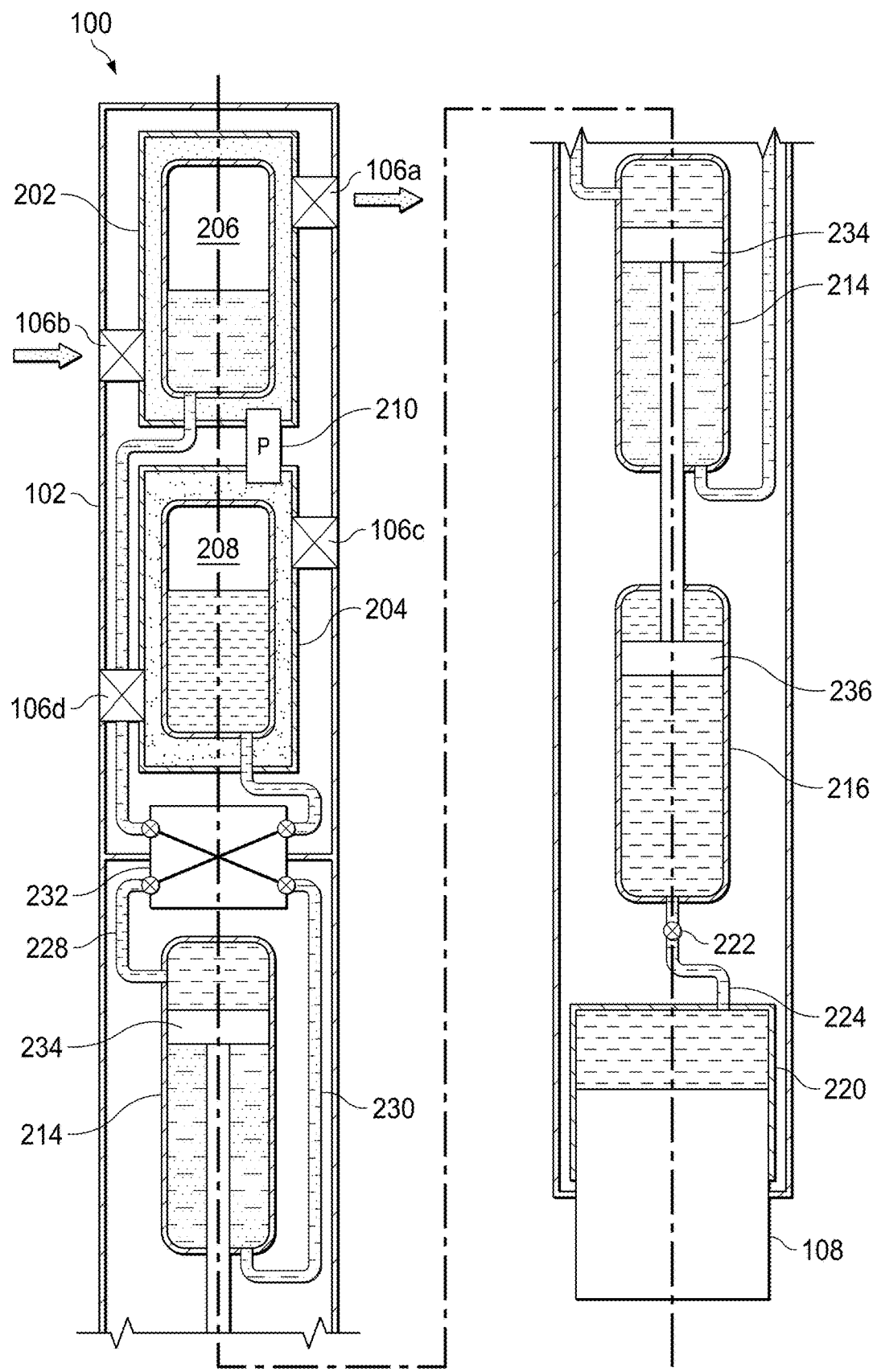

As shown in FIG. 3F, and with respect to position #6 in FIG. 4, the vehicle 100 is at or near the bottom of its dive. At some point in the descent profile, it becomes necessary to slow down the vehicle 100 to achieve a desired depth. The surrounding seawater temperature can also be profiled using on-board temperature sensors. In some dive operations, it may be desired to reach a seawater temperature of 5 degrees C. or a maximum depth of 1000 m.

The ports 106a-106b of the top jacket 202 may open before the bottom depth is reached to take advantage of mixing flow scavenging into the top jacket 202. At or around that point in time, the hydraulic line 224 opens, and then the crossover valves 232 open, so that superior differential pressure/force from the warm $CO_2$ in the bottom tank 208 to the cold $CO_2$ in the top tank 206 overcomes the inward pressure on the buoyancy plug 108 at depth.

For example, in an embodiment, the pressure differences in the $CO_2$ in the tanks 206-208 could be approximately 500 psi. This causes movement of the pistons 234-236 at 500 psi. If the cross-sectional area of the pistons 234-236 is one tenth of the cross-sectional area of the buoyancy plug 108, then mechanical advantage in the hydraulics allows the 500 psi $CO_2$ pressure difference to result in 5000 psi of outward pressure on the buoyancy plug 108, which is more than enough to overcome 1500 psi seawater pressure at 1000 m depth. For example, a 100 cm movement of the pistons 234-236 at 500 psi would result in a 10 cm movement of the buoyancy plug at 5000 psi. Of course, these numbers are merely one example. Other pressures, dimensions, and ratios are possible and within the scope of this disclosure.

Figure 3G:
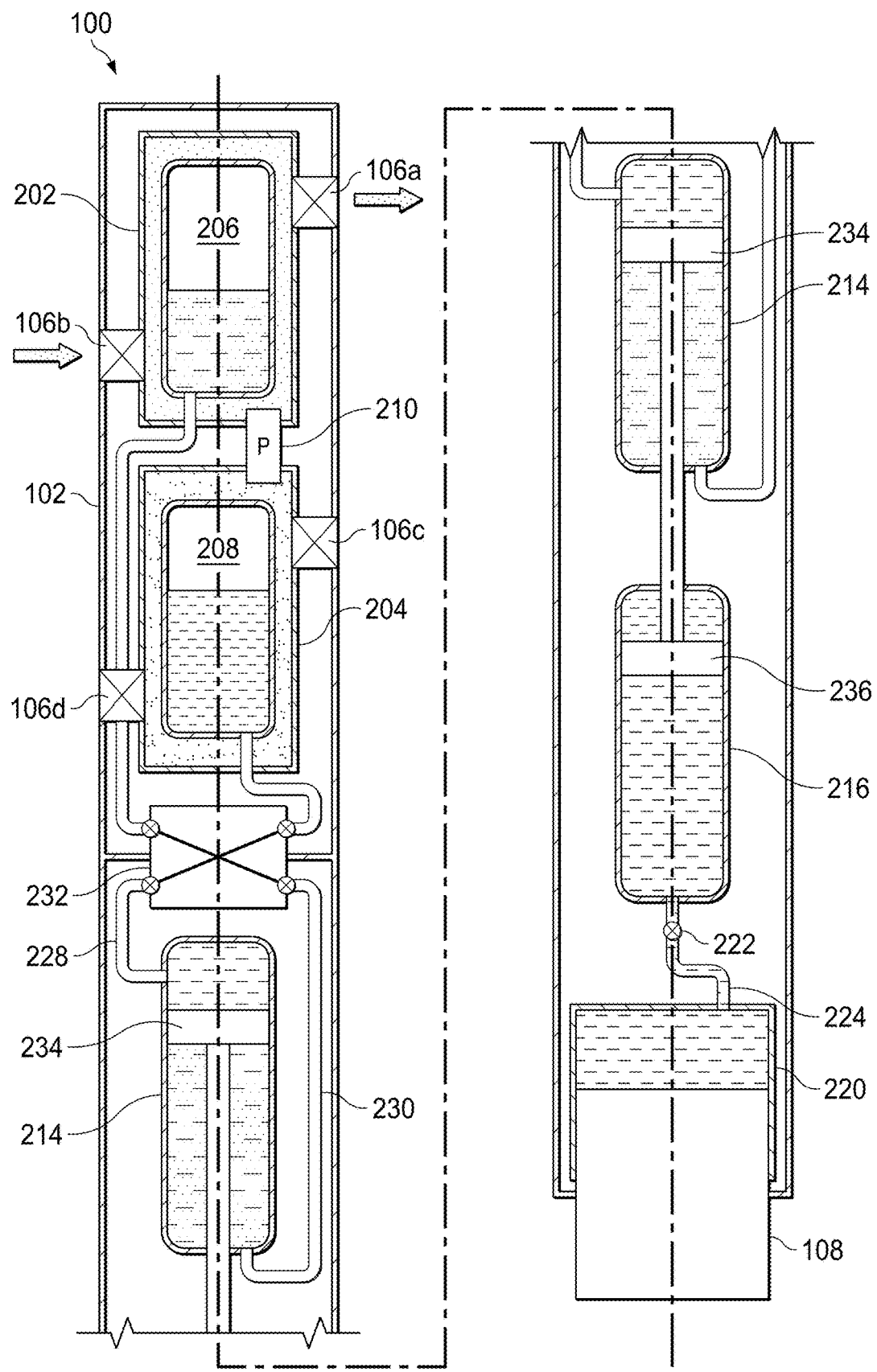

As shown in FIG. 3G, and with respect to position #7 in FIG. 4, the vehicle 100 is at the bottom of the dive. At this point, the hydraulics are locked and the fluid lines 228-230 are closed. The ports 106a-106b of the top jacket 202 are open in order to cause mixing flow scavenging between the (relatively warmer) water in the top jacket 202 and the colder external seawater (which may be, e.g., 5-8 degrees C.). In some embodiments, the soak period may be approximately twenty minutes.

Figure 3H:
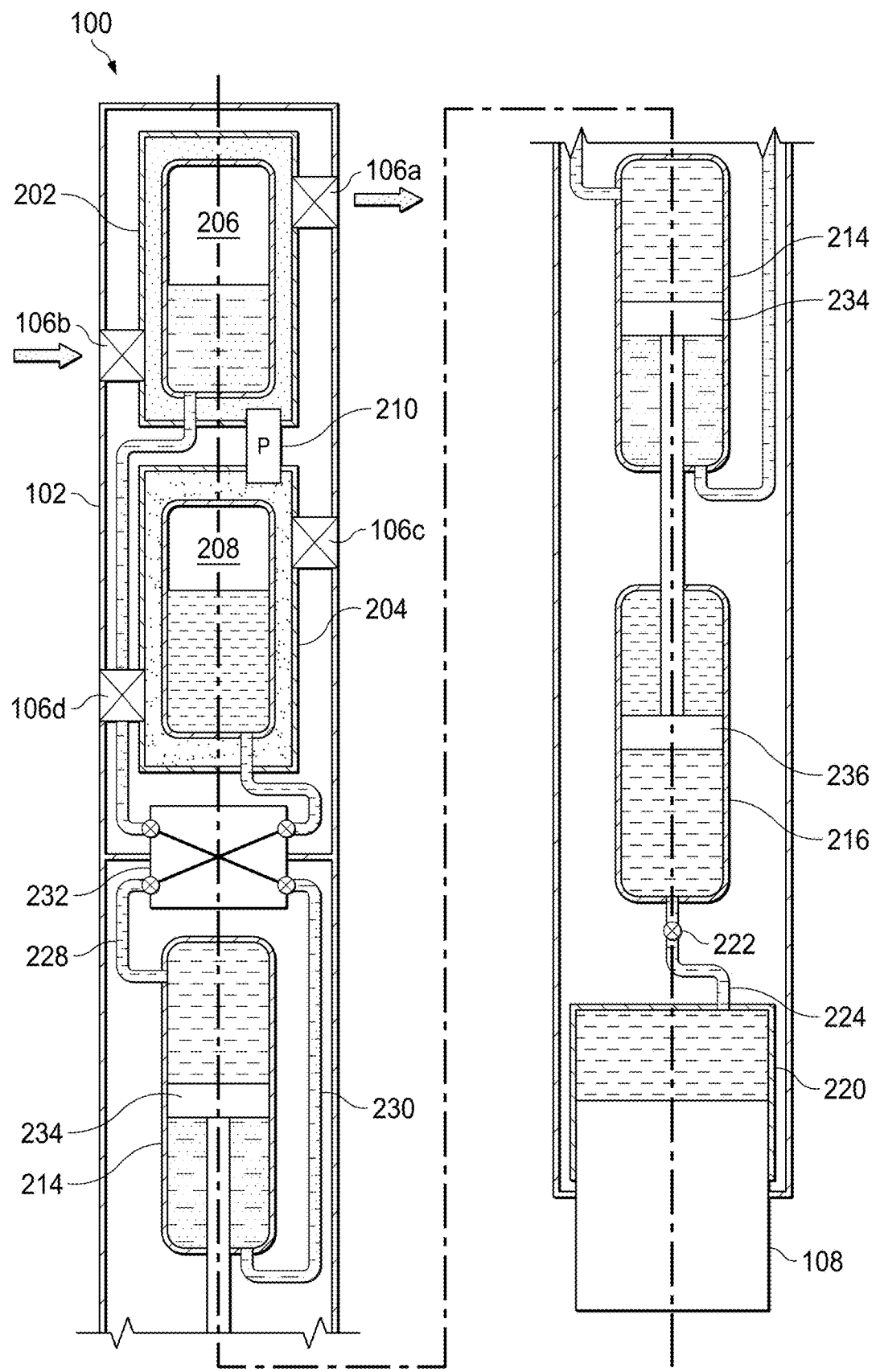

As shown in FIG. 3H, and with respect to position #8 in FIG. 4, the vehicle 100 is preparing to ascend. At this time, the hydraulic valve 222 opens and the fluid lines 228-230 open. Pressure differences between the $CO_2$ in the top tank 206 and the $CO_2$ in the bottom tank 208 cause $CO_2$ to flow into and out of the actuator cylinder 214, resulting into downward movement of the pistons 234-236 and outward movement of the buoyancy plug 108. In addition, the ports 106a-106b of the top jacket 202 may remain open for a short time to continue mixing flow scavenging of cold seawater into the top jacket 202.

Figure 3I:
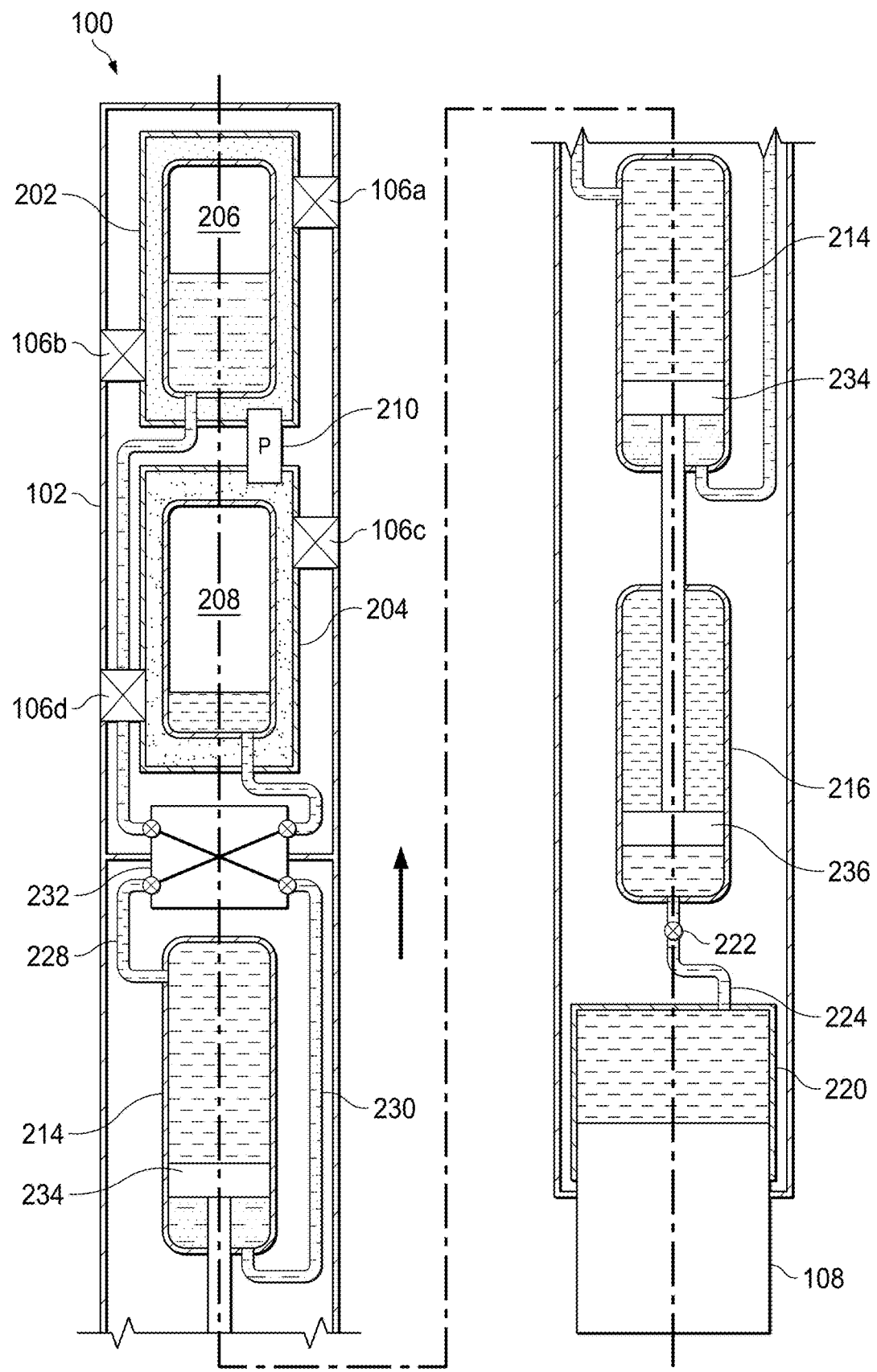

As shown in FIG. 3I, and with respect to position #9 in FIG. 4, the vehicle 100 is ascending. The buoyancy plug 108 is now extending outward for greater buoyancy. At this time, the ports 106a-106b of the top jacket 202 close. During the ascent, seawater temperature and pressure can be monitored by on-board sensors.

Figure 3J:
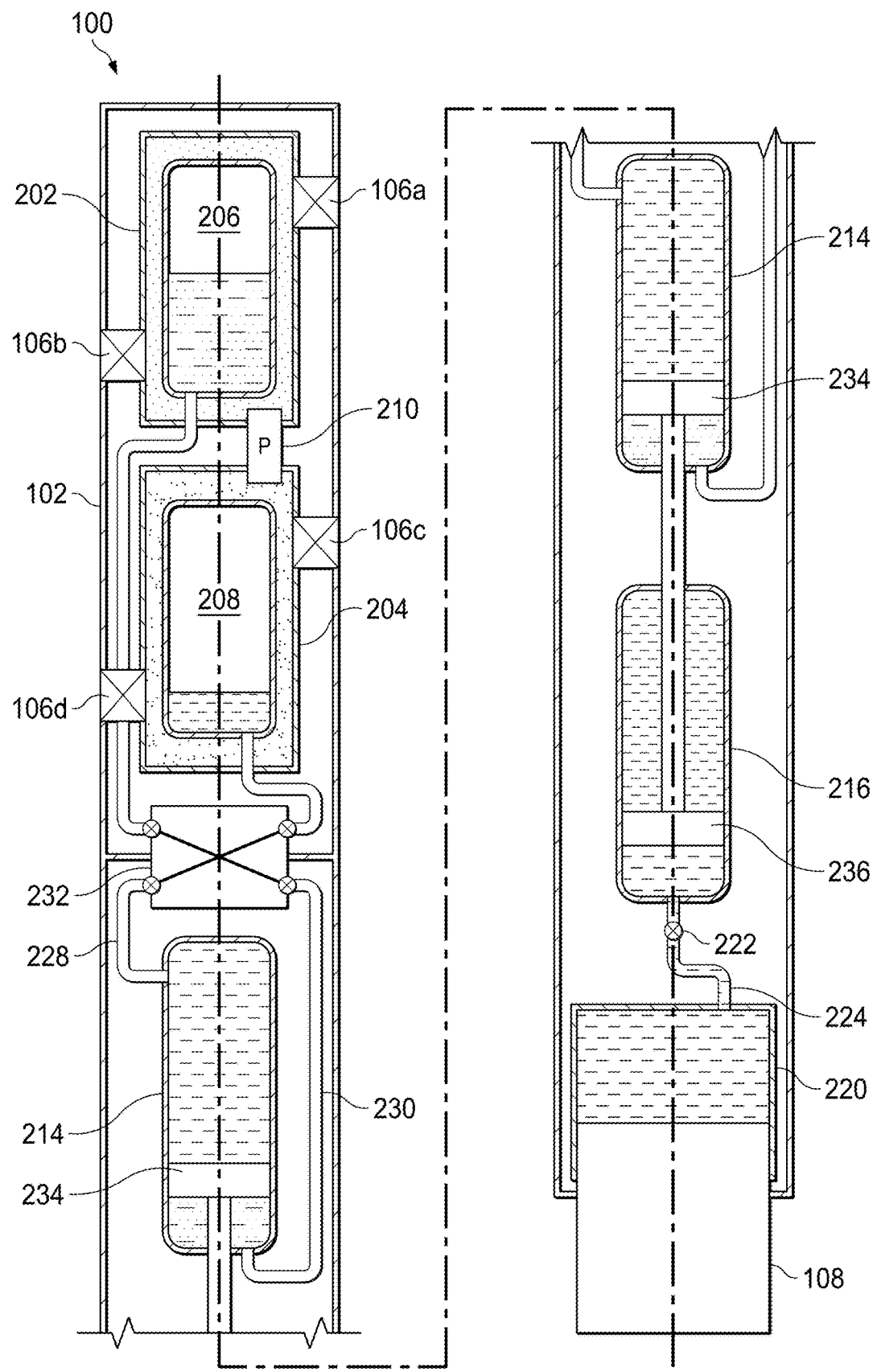

As shown in FIG. 3J, and with respect to position #10 in FIG. 4, the vehicle 100 is ascending. The hydraulic valve 222 locks when the buoyancy plug 108 is fully extended. The fluid lines 228-230 close. All ports 106a-106d are closed. Seawater temperature and pressure can continue to be monitored.

Figure 3K:
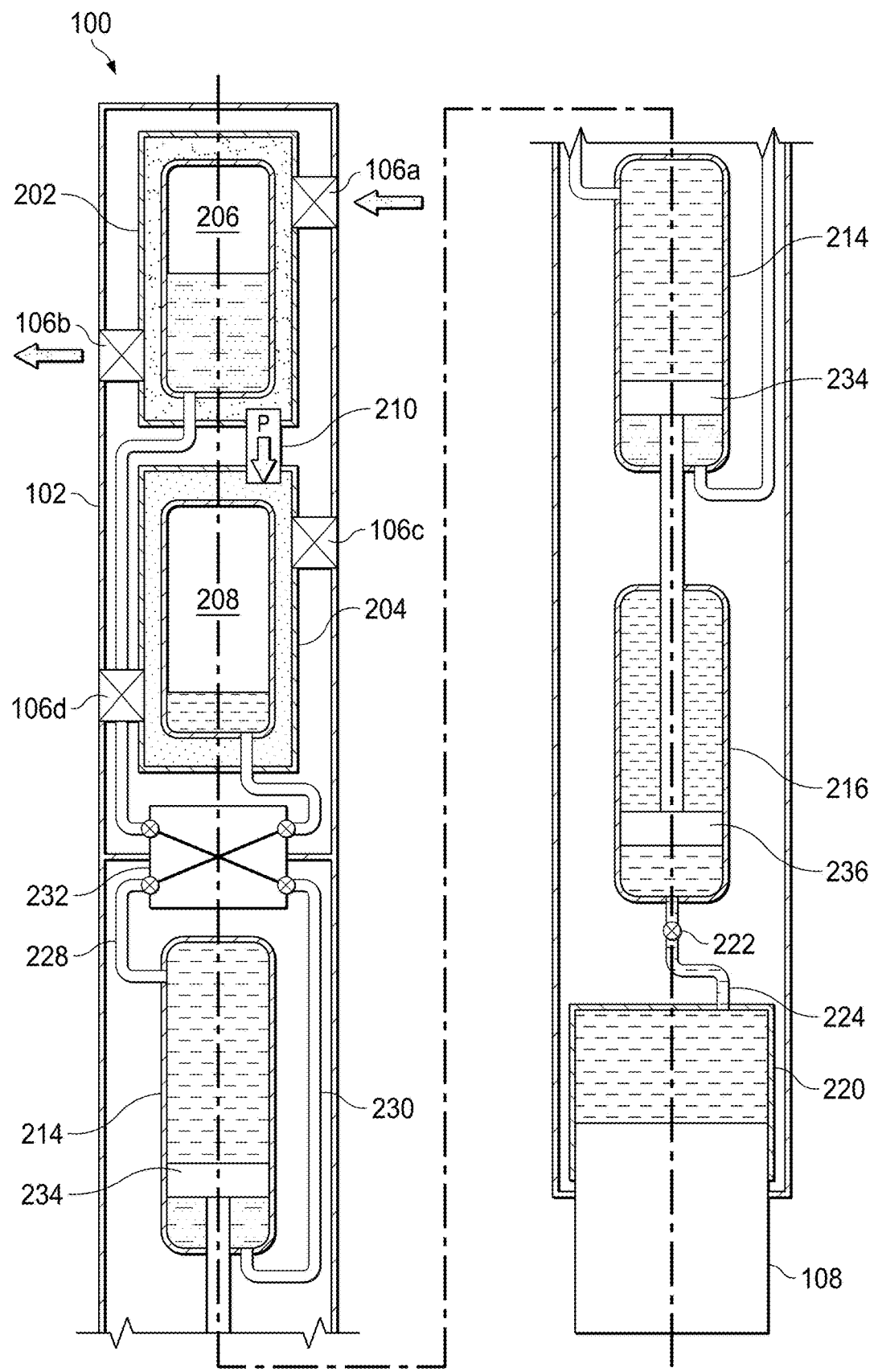

As shown in FIG. 3K, and with respect to position #11 in FIG. 4, the vehicle 100 is at or near the ocean surface. The ports 106a-106b of the top jacket 202 can open to take advantage of mixing flow scavenging of warmer seawater into the top jacket 202.

Figure 3L:
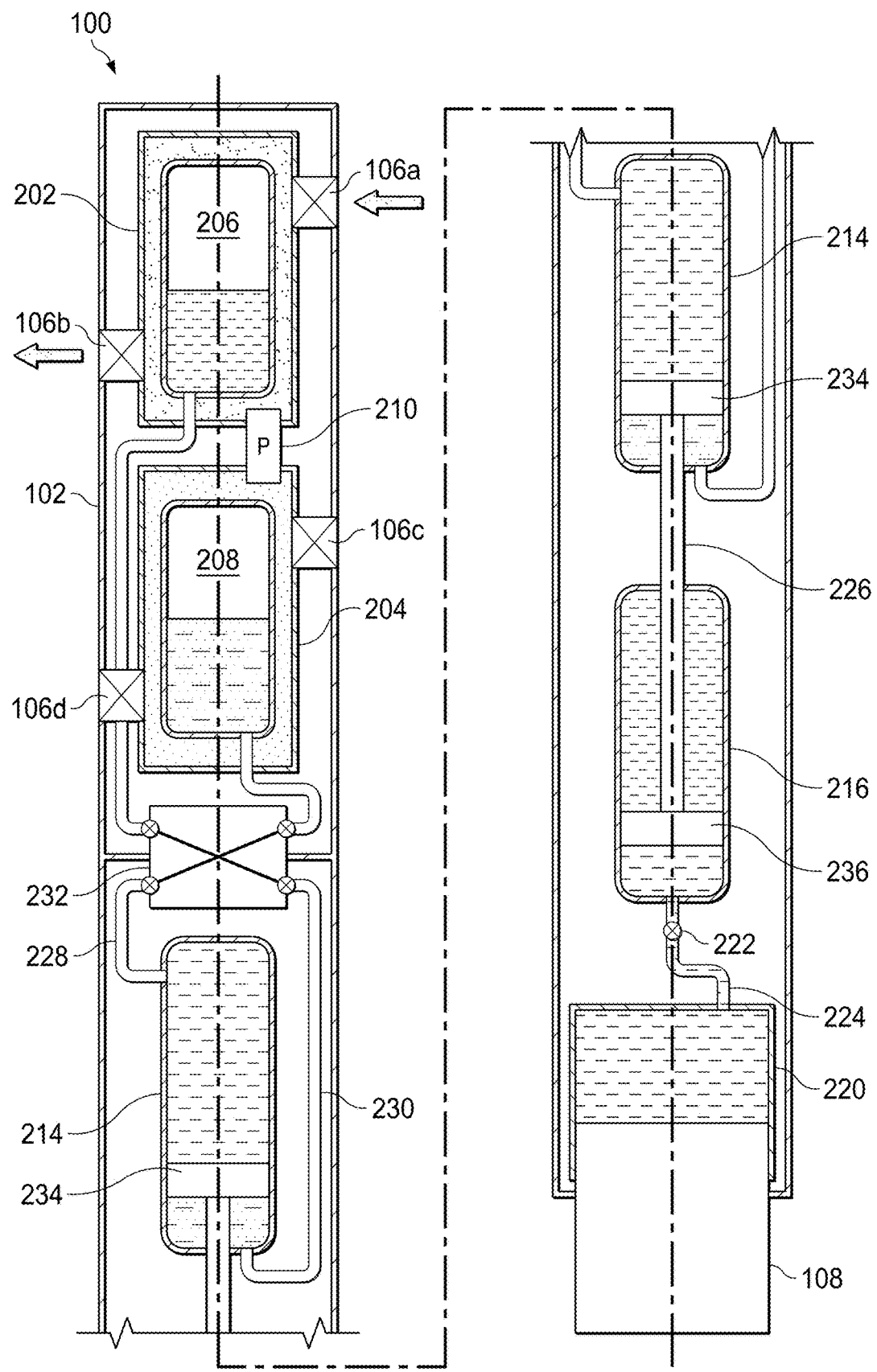

As shown in FIG. 3L, and with respect to position #12 in FIG. 4, the vehicle 100 is at or near the ocean surface, prior to a subsequent dive. The ports 106a-106b of the top jacket 202 remain open so that the $CO_2$ in the top tank 206 warms up from the warm surface seawater flowing into the top jacket 202. The hydraulic valve 222 and the fluid lines 228-230 remain closed.

Although FIGS. 1 through 4 illustrate an example underwater vehicle 100 configured to operate using ocean thermal energy conversion, various changes may be made to FIGS. 1 through 4. For example, the arrangement and relative sizes of the components shown in FIGS. 1 through 4 is for illustration only. Various components may not be shown to scale. Also, various components may be placed in any other suitable arrangement. In addition, while the vehicle 100 is described as using $CO_2$ as a fluid for generating thermal energy conversion, other fluids could be used.

Figure 5:
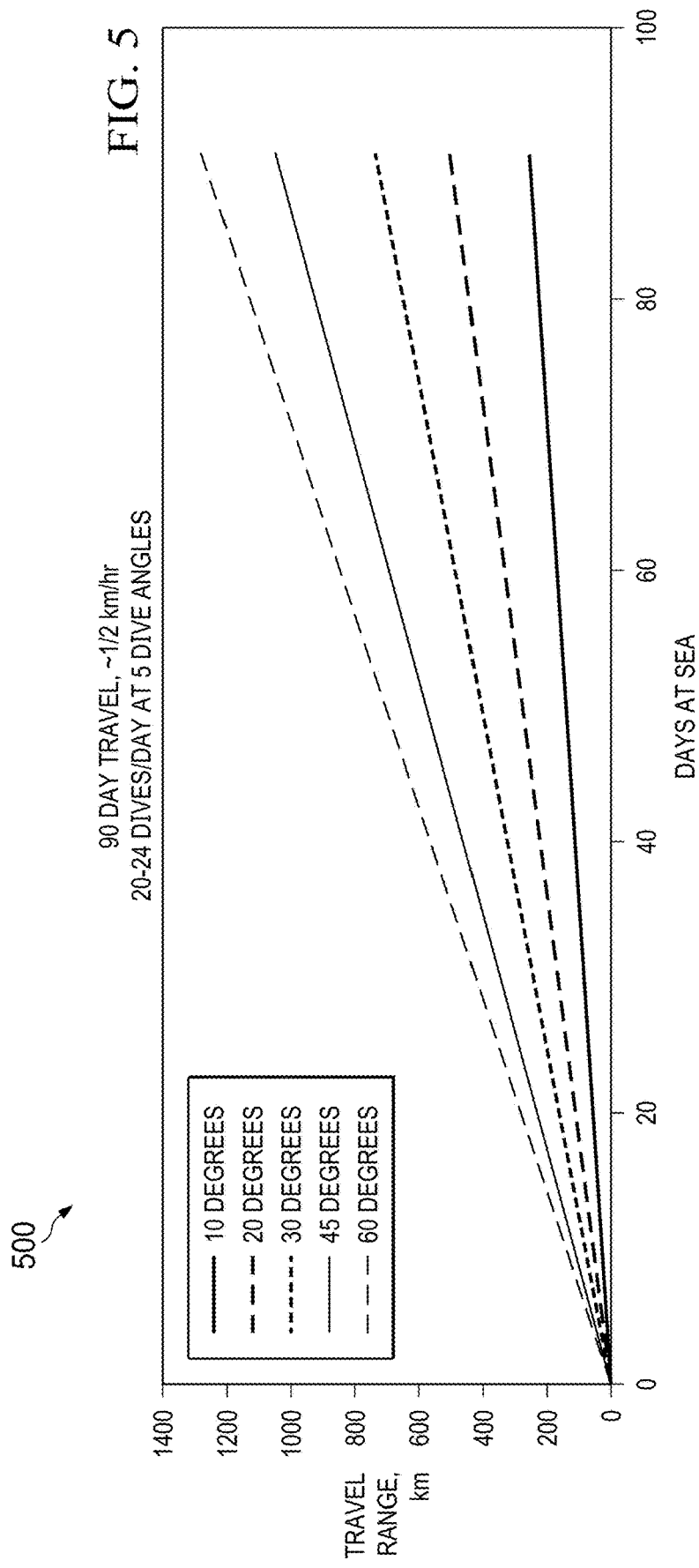
FIG. 5 illustrates a chart showing lateral distances that the vehicle of FIG. 1 can travel over time while performing dive cycles, according to this disclosure.

FIG. 5 illustrates a chart 500 showing lateral distances that the vehicle 100 can travel over time while performing dive cycles, according to this disclosure. As shown in FIG. 5, the vehicle 100 can descend and ascend at an angle that is measured from vertical. The larger the angle, the less vertical the path of the vehicle 100 during each descent and ascent of a dive cycle. When the vehicle 100 dives at an angle, the vehicle 100 necessarily travels laterally while moving up and down. Over time and multiple dives, the vehicle 100 can travel a lateral distance of many kilometers. The angle of each descent/ascent during a dive cycle is determined largely by the positions and angular orientations of the fins 104a-104b.

Figure 6:
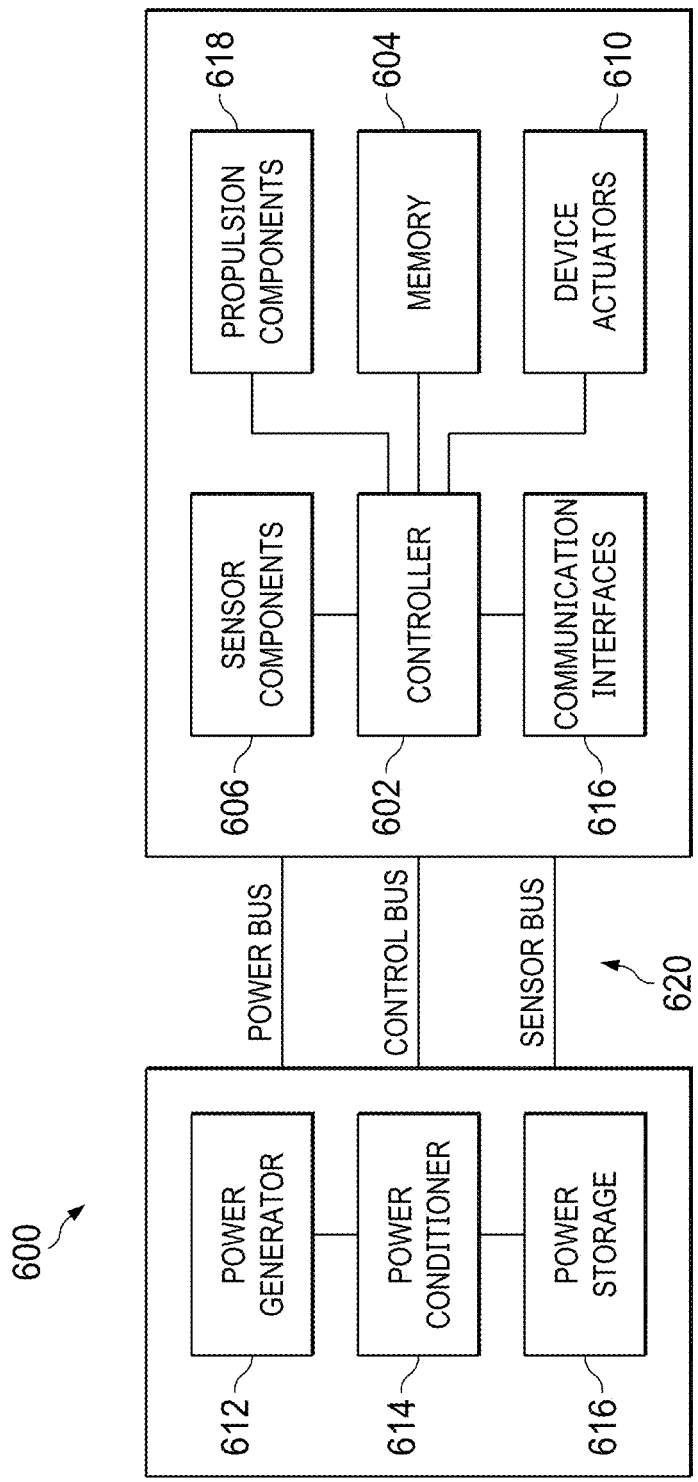
FIG. 6 illustrates example components of an underwater vehicle that operates using ocean thermal energy conversion according to this disclosure.

FIG. 6 illustrates example components of an underwater vehicle 600 that operates using ocean thermal energy conversion according to this disclosure. The underwater vehicle 600 can, for example, represent the underwater vehicle 100 described above. The components shown in FIG. 6 can therefore represent internal or other components within the vehicle 100 that were not shown in other figures.

As shown in FIG. 6, the vehicle 600 includes at least one controller 602 and at least one memory 604. The controller 602 controls the overall operation of the vehicle 600 and can represent any suitable hardware or combination of hardware and software/firmware for controlling the vehicle 600. For example, the controller 602 can represent at least one processor configured to execute instructions obtained from the memory 604. The controller 602 may include any suitable number(s) and type(s) of processors or other computing or control devices in any suitable arrangement. Example types of controllers 602 include microprocessors, microcontrollers, digital signal processors, field programmable gate arrays, application specific integrated circuits, and discrete circuitry.

The memory 604 stores data used, generated, or collected by the controller 602 or other components of the vehicle 600. Each memory 604 represents any suitable structure(s) configured to store and facilitate retrieval of information (such as data, program code, and/or other suitable information on a temporary or permanent basis). Some examples of the memory 604 can include at least one random access memory, read only memory, Flash memory, or any other suitable volatile or non-volatile storage and retrieval device(s).

The vehicle 600 in this example also includes one or more sensor components 606 and one or more communication interfaces 608. The sensor components 606 include sensors that can be used to sense any suitable characteristics of the vehicle 600 itself or the environment around the vehicle 600. For example, the sensor components 606 can include a position sensor, such as a Global Positioning System (GPS) sensor, which can identify the position of the vehicle 600. This can be used, for instance, to help make sure that the vehicle 600 is following a desired path or is maintaining its position at or near a desired location. The sensor components 606 can also include pressure sensors or temperature sensors used to estimate a depth of the underwater vehicle 600. The sensor components 606 can further include audio sensors for capturing audio signals, photodetectors or other cameras for capturing video signals or photographs, or any other or additional components for capturing any other or additional information. Each sensor component 606 includes any suitable structure for sensing one or more characteristics.

The communication interfaces 608 support interactions between the vehicle 600 and other devices or systems. For example, the communication interfaces 608 can include at least one radio frequency (RF) or other transceiver configured to communicate with one or more satellites, airplanes, ships, or other nearby or distant devices. The communication interfaces 608 allow the vehicle 600 to transmit data to one or more external destinations, such as information associated with data collected by the sensor components 606. The communication interfaces 608 also allow the vehicle 600 to receive data from one or more external sources, such as instructions for other or additional operations to be performed by the vehicle 600 or instructions for controlling where the vehicle 600 operates. Each communication interface 608 includes any suitable structure(s) supporting communication with the vehicle 600.

The vehicle 600 may include one or more device actuators 610, which are used to adjust one or more operational aspects of the vehicle 600. For example, the device actuators 610 can be used to move the fins 104a-104b of the vehicle while the vehicle is ascending or descending. As a particular example, the device actuators 610 can be used to move the fins 104a-104b during ascent or descent of the vehicle so that the vehicle obtains a desired attitude with respect to the Earth's magnetic field (in order to achieve a desired descent or ascent path). Each device actuator 610 includes any suitable structure for physically modifying one or more components of an underwater vehicle. Note, however, that the vehicle 600 need not include device actuators 610, such as when the vehicle 600 lacks moveable fins.

The vehicle 600 further includes a power generator 612, a power conditioner 614, and a power storage 616. The power generator 612 generally operates to create electrical energy. The power generator 612 includes any suitable structure configured to generate electrical energy based on thermal differences.

The power conditioner 614 is configured to condition or convert the power generated by the power generator 612 into a suitable form for storage or use. For example, the power conditioner 614 can receive a direct current (DC) signal from the power generator 612, filter the DC signal, and store power in the power storage 616 based on the DC signal. The power conditioner 614 can also receive power from the power storage 616 and convert the power into suitable voltage(s) and current(s) for other components of the vehicle 600. The power conditioner 614 includes any suitable structure(s) for conditioning or converting electrical power.

The power storage 616 is used to store electrical power generated by the power generator 612 for later use. The power storage 616 represents any suitable structure(s) for storing electrical power, such as one or more batteries or super-capacitors.

The vehicle 600 may include one or more propulsion components 618, which represent components used to physically move the vehicle 600 in or through water. In some embodiments, the propulsion components 618 can represent one or more motors or other propulsion systems. Note, however, that the vehicle 600 need not include propulsion components 618, such as when the vehicle 600 represents a passive buoy.

Various buses 620 can be used to interconnect components of the vehicle 600. For example, a power bus can transport power to various components of the vehicle 600. The power generated by the power generator 612 and the power stored in the power storage 616 can be supplied to any of the components in FIG. 6. For instance, electrical power can be provided to the controller 602 and memory 604 to facilitate computations and instruction execution by the controller 602 and data storage/retrieval by the memory 604. Electrical power can also be provided to the sensor components 606, communication interfaces 608, and device actuators 610 in order to support sensing, communication, and actuation operations. In addition, electrical power can be provided to the propulsion components 618 in order to support movement of the vehicle 600. The power bus may have a range of voltages and purposes, such as 5V, 12V, and 24V main drive power for servos and other device actuators (such as ballasting). A control bus can transport control signals for various components, such as control signals generated by the controller 602. A sensor bus can transport sensor data for various components.

Although FIG. 6 illustrates one example of components of an underwater vehicle 600 that operates using ocean thermal energy conversion, various changes may be made to FIG. 6. For example, various components in FIG. 6 can be combined, further subdivided, rearranged, or omitted or additional components can be added according to particular needs.

Figure 7:
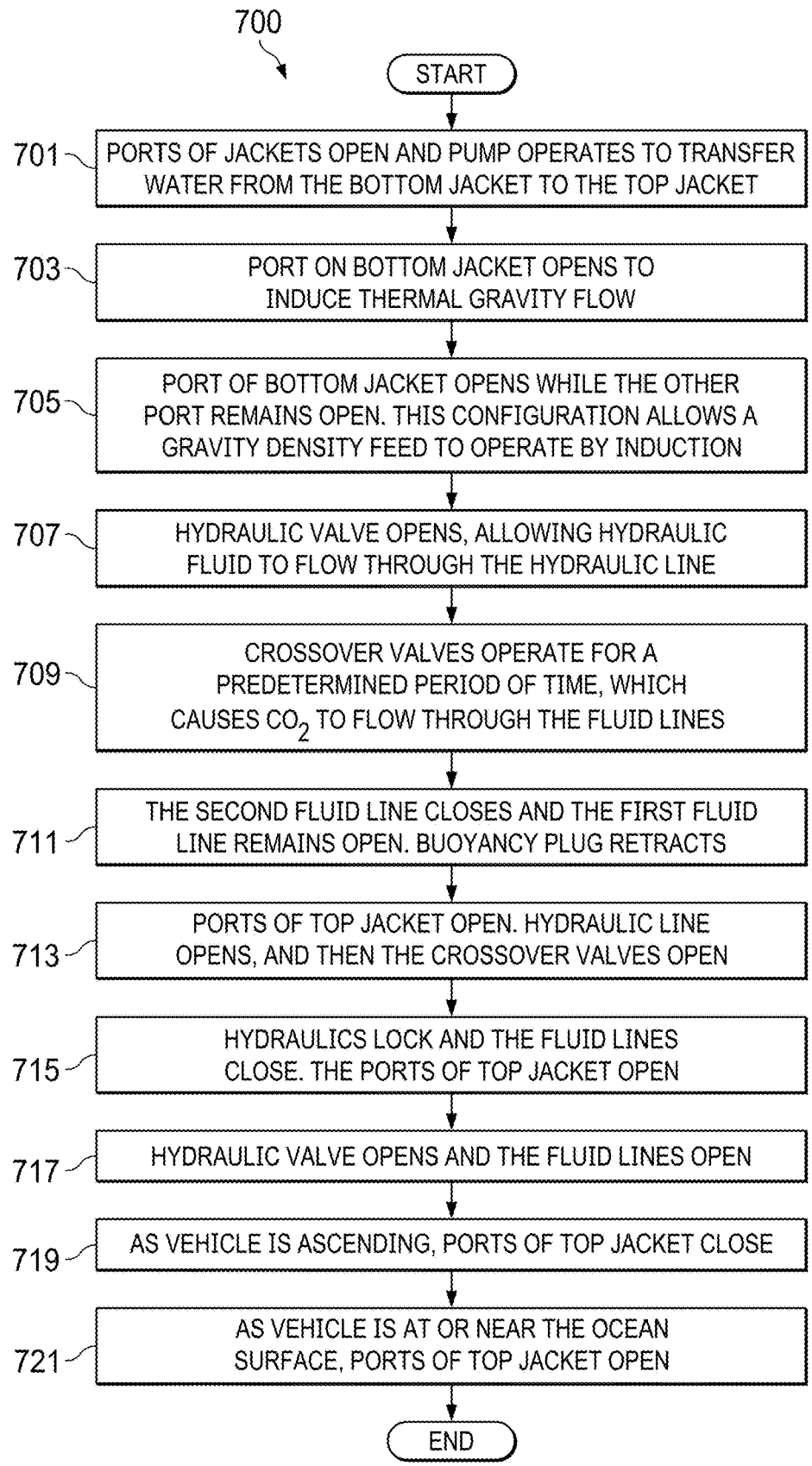
FIG. 7 illustrates an example method for operating an underwater vehicle using ocean thermal energy conversion according to this disclosure.

FIG. 7 illustrates an example method 700 for operating an underwater vehicle using ocean thermal energy conversion according to this disclosure. For ease of explanation, the method 700 is described with respect to the vehicle 100. However, the method 700 could be used in any other suitable device or system.

Prior to step 701, the vehicle 100 is at the surface of the water prior to a dive. At step 701, the port 106a of the top jacket 202 opens, and the port 106d of the bottom jacket 204 opens, and the pump 210 operates to transfer colder water from the bottom jacket 204 to the top jacket 202. The transfer of water from the bottom jacket 204 to the top jacket 202 causes warm seawater at the surface to enter the bottom jacket 204 through the port 106d, and causes warm water to vent out of the top jacket 202 through the port 106a. The operation of the pump 210 is a timed operation.

At step 703, when the pump 210 times out, the port 106c on the bottom jacket 204 opens to induce thermal gravity flow. The vehicle 100 begins to descend from the water surface.

At step 705, the port 106c of the bottom jacket 204 opens while the port 106d remains open. This configuration allows a gravity density feed to operate by induction. The top tank 206 cools and the bottom tank 208 warms up as fresh surface water flows in through the port 106c.

At step 707, the vehicle 100 is beginning its dive, and the hydraulic valve 222 opens, allowing hydraulic fluid 218 to flow through the hydraulic line 224, thereby permitting the pistons 234-236 freedom to move.

At step 709, the crossover valves 232 operate for a predetermined period of time, which causes $CO_2$ to flow through the fluid lines 228-230. In particular, $CO_2$ flows through the first fluid line 228 from the actuator cylinder 214 to the top tank 206, and $CO_2$ flows through the second fluid line 230 from the bottom tank 208 to the actuator cylinder 214. This changes the fluid levels in the actuator cylinder 214, which in turn causes the pistons 234-236 to move inward. When the piston 236 moves inward, hydraulic fluid 218 is drawn from the fluid reservoir 220 into the hydraulic cylinder 216, thereby retracting the buoyancy plug 108 for initial descent.

At step 711, the second fluid line 230 closes and the first fluid line 228 remains open. The buoyancy plug 108 push cold $CO_2$ from the actuator cylinder 214 back into the top tank 206. The descent of the vehicle 100 and the rising water pressure further causes the buoyancy plug 108 to retract.

At step 713, before the bottom depth is reached, the ports 106a-106b of the top jacket 202 open to take advantage of mixing flow scavenging into the top jacket 202. At or around that point in time, the hydraulic line 224 opens, and then the crossover valves 232 open, so that superior differential pressure/force from the warm $CO_2$ in the bottom tank 208 to the cold $CO_2$ in the top tank 206 overcomes the inward pressure on the buoyancy plug 108 at depth.

At step 715, when the vehicle 100 is at the bottom of the dive, the hydraulics lock and the fluid lines 228-230 close. The ports 106a-106b of the top jacket 202 open in order to cause mixing flow scavenging between the water in the top jacket 202 and the colder external seawater. In some embodiments, the soak period may be approximately twenty minutes.

As step 717, as the vehicle 100 is preparing to ascend, the hydraulic valve 222 opens and the fluid lines 228-230 open. Pressure differences between the $CO_2$ in the top tank 206 and the $CO_2$ in the bottom tank 208 cause $CO_2$ to flow into and out of the actuator cylinder 214, resulting into downward movement of the pistons 234-236 and outward movement of the buoyancy plug 108.

At step 719, as the vehicle 100 is ascending, the ports 106a-106b of the top jacket 202 close. During the ascent, seawater temperature and pressure can be monitored by on-board sensors. The hydraulic valve 222 locks when the buoyancy plug 108 is fully extended. The fluid lines 228-230 close.

At step 721, as the vehicle 100 is at or near the ocean surface, the ports 106a-106b of the top jacket 202 open to take advantage of mixing flow scavenging of warmer seawater into the top jacket 202. The ports 106a-106b of the top jacket 202 remain open for a period of time so that the $CO_2$ in the top tank 206 warms up from the warm surface seawater flowing into the top jacket 202.

Although FIG. 7 illustrates one example of a method 700 for operating an underwater vehicle using ocean thermal energy conversion, various changes may be made to FIG. 7. For example, while shown as a series of steps, various steps in FIG. 7 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A system comprising:
a first jacket comprising first and second ports, the first jacket configured to contain water and a first tank, the first tank configured to store a first fluid under pressure;
a second jacket comprising third and fourth ports, the second jacket configured to contain water and a second tank, the second tank configured to store a second fluid under pressure;
an actuator cylinder defining a space configured to receive the first fluid from the first tank and the second fluid from the second tank, the actuator cylinder comprising an actuator piston that divides the space into a first volume for the first fluid and a second volume for the second fluid;
a hydraulic cylinder defining a space configured to receive a hydraulic fluid, the hydraulic cylinder comprising a hydraulic piston configured to move and change an amount of the hydraulic fluid in the hydraulic cylinder, wherein the hydraulic piston is fixedly coupled to the actuator piston; and
a buoyancy plug configured to change a position inward or outward relative to at least one surrounding portion of a vehicle proportionate to an amount of the hydraulic fluid displaced in the hydraulic cylinder, wherein the position of the buoyancy plug alters a buoyancy of the vehicle.

2. The system of claim 1, wherein:
the first and second ports are configured to allow water to enter or exit the first jacket; and
the third and fourth ports are configured to allow water to enter or exit the second jacket.

3. The system of claim 1, further comprising:
a pump configured to cause water to move between the first jacket and the second jacket.

4. The system of claim 1, further comprising:
a fluid reservoir configured to store a portion of the hydraulic fluid, wherein the buoyancy plug is configured to retract into or extend out from the fluid reservoir based on a change of position of the hydraulic piston.

5. The system of claim 4, further comprising:
a hydraulic valve configured to allow or restrict a flow of the hydraulic fluid between the hydraulic cylinder and the fluid reservoir.

6. The system of claim 1, further comprising:
a first fluid line configured to fluidly couple the actuator cylinder to the first tank; and
a second fluid line configured to fluidly couple the actuator cylinder to the second tank.

7. The system of claim 1, wherein the first tank is disposed above the second tank in the vehicle when the vehicle is oriented for a dive operation.

8. The system of claim 1, wherein the first and second fluids are liquid carbon dioxide.

9. A vehicle comprising:
a body; and
a buoyancy engine comprising:
   a first jacket comprising first and second ports, the first jacket configured to contain water and a first tank, the first tank configured to store a first fluid under pressure;
   a second jacket comprising third and fourth ports, the second jacket configured to contain water and a second tank, the second tank configured to store a second fluid under pressure;
   an actuator cylinder defining a space configured to receive the first fluid from the first tank and the second fluid from the second tank, the actuator cylinder comprising an actuator piston that divides the space into a first volume for the first fluid and a second volume for the second fluid;
   a hydraulic cylinder defining a space configured to receive a hydraulic fluid, the hydraulic cylinder comprising a hydraulic piston configured to move and change an amount of the hydraulic fluid in the hydraulic cylinder, wherein the hydraulic piston is fixedly coupled to the actuator piston; and
   a buoyancy plug configured to change a position inward or outward relative to at least one surrounding portion of the vehicle proportionate to an amount of the hydraulic fluid displaced in the hydraulic cylinder, wherein the position of the buoyancy plug alters a buoyancy of the vehicle.

10. The vehicle of claim 9, wherein:
the first and second ports are configured to allow water to enter or exit the first jacket; and
the third and fourth ports are configured to allow water to enter or exit the second jacket.

11. The vehicle of claim 9, further comprising:
a pump configured to cause water to move between the first jacket and the second jacket.

12. The vehicle of claim 9, further comprising:
a fluid reservoir configured to store a portion of the hydraulic fluid, wherein the buoyancy plug is configured to retract into or extend out from the fluid reservoir based on a change of position of the hydraulic piston.

13. The vehicle of claim 12, further comprising:
a hydraulic valve configured to allow or restrict a flow of the hydraulic fluid between the hydraulic cylinder and the fluid reservoir.

14. The vehicle of claim 9, further comprising:
a first fluid line configured to fluidly couple the actuator cylinder to the first tank; and
a second fluid line configured to fluidly couple the actuator cylinder to the second tank.

15. The vehicle of claim 9, wherein the first tank is disposed above the second tank in the vehicle when the vehicle is oriented for a dive operation.

16. The vehicle of claim 9, wherein the first and second fluids are liquid carbon dioxide.

17. A method comprising:
creating a flow of a first fluid between a first tank and an actuator cylinder and a flow of a second fluid between a second tank and the actuator cylinder, wherein the first tank is disposed in a first jacket that contains water and the second tank is disposed in a second jacket that contains water, wherein the first fluid is stored under pressure in the first tank and the second fluid is stored under pressure in the second tank, wherein the actuator cylinder defines a space configured to receive the first fluid from the first tank and the second fluid from the second tank;
moving an actuator piston disposed within the actuator cylinder and a hydraulic piston disposed in a hydraulic cylinder, wherein the hydraulic piston is fixedly coupled to the actuator piston, wherein movement of the hydraulic piston changes an amount of hydraulic fluid in the hydraulic cylinder; and
changing a position of a buoyancy plug inward or outward relative to at least one surrounding portion of a vehicle proportionate to an amount of the hydraulic fluid displaced in the hydraulic cylinder, wherein the position of the buoyancy plug alters a buoyancy of the vehicle.

18. The method of claim 17, further comprising:
opening first and second ports of the first jacket to allow water to enter or exit the first jacket; and
opening third and fourth ports of the second jacket to allow water to enter or exit the second jacket.

19. The method of claim 17, further comprising:
operating a pump to cause water to move between the first jacket and the second jacket.

20. The method of claim 17, wherein the buoyancy plug is configured to retract into or extend out from a fluid reservoir based on a change of position of the hydraulic piston, the fluid reservoir configured to store a portion of the hydraulic fluid.

* * * * *